United States Patent
Hu et al.

(10) Patent No.: US 9,246,654 B2
(45) Date of Patent: *Jan. 26, 2016

(54) METHODS AND ARRANGEMENTS FOR TRANSMITTING AND DECODING REFERENCE SIGNALS

(71) Applicant: Telefonaktiebolaget L M Ericsson (publ), Stockholm (SE)

(72) Inventors: Yang Hu, Beijing (CN); Xinghua Song, Beijing (CN); Jianfeng Wang, Beijing (CN)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/193,466

(22) Filed: Feb. 28, 2014

(65) Prior Publication Data

US 2014/0204913 A1 Jul. 24, 2014

Related U.S. Application Data

(63) Continuation of application No. 13/159,563, filed on Jun. 14, 2011, now Pat. No. 8,780,832, which is a continuation of application No. PCT/CN2010/000927, filed on Jun. 24, 2010, and a continuation of application No. PCT/CN2010/000865, filed on Jun. 16, 2010.

(51) Int. Cl.
*H04W 4/00* (2009.01)
*H04L 5/00* (2006.01)

(52) U.S. Cl.
CPC ............ *H04L 5/0053* (2013.01); *H04L 5/0017* (2013.01); *H04L 5/0051* (2013.01); *H04L 5/0048* (2013.01); *H04W 4/00* (2013.01)

(58) Field of Classification Search
CPC ...................................................... H04L 5/0051
USPC .......................................................... 370/329
See application file for complete search history.

(56) References Cited

U.S. PATENT DOCUMENTS 6,115,425 A * 9/2000 Adachi et al. ................. 375/253
7,746,938 B2 6/2010 Hasegawa et al.
(Continued)

FOREIGN PATENT DOCUMENTS

CN 101621492 A 1/2010
JP 2011/193467 A 9/2011
(Continued)

OTHER PUBLICATIONS

Japanese Office Action in corresponding Japanese Application No. 2013-514514 dated Mar. 31, 2014.
(Continued)

*Primary Examiner* — Wei Zhao
(74) *Attorney, Agent, or Firm* — Patent Portfolio Builders PLLC

(57) ABSTRACT

In a radio network node, a reference signal is transmitted over an antenna port, in a code division multiplexing (CDM) group. The CDM group includes CDM subgroups of resource elements, the CDM subgroups being transmitted on different subcarriers. First, the radio network node transmits the reference signal over a first CDM subgroup using an orthogonal cover code (OOC). The first CDM subgroup includes resource elements in a first time slot and a subsequent time slot. Then, the radio network node transmits the reference signal over a second CDM subgroup using a permutation of the OOC. The second CDM subgroup includes resource elements in the first time slot and the second time slot. The permutation of the OOC is selected such that to enable decoding of the reference signal in the frequency domain, by applying the OOC only to resource elements in the CDM group in the first time slot.

10 Claims, 18 Drawing Sheets

(56) References Cited

U.S. PATENT DOCUMENTS

| | | | |
|---|---|---|---|
| 2007/0109956 A1* | 5/2007 | Kwon et al. | 370/208 |
| 2009/0092148 A1* | 4/2009 | Zhang et al. | 370/458 |
| 2010/0177694 A1 | 7/2010 | Yang et al. | |
| 2012/0002568 A1* | 1/2012 | Tiirola et al. | 370/252 |

FOREIGN PATENT DOCUMENTS

| | | |
|---|---|---|
| WO | 03/061170 A1 | 7/2003 |
| WO | 2011/120233 A1 | 10/2011 |
| WO | 2011/137699 A1 | 11/2011 |
| WO | 2011/156940 A1 | 12/2011 |

OTHER PUBLICATIONS

Decision of Refusal in corresponding Japanese Application No. 2013-514514 dated Dec. 11, 2014.

LTE Advanced, 3GPP; "3rd Generation Partnership Project; Technical Specification Group Radio Access Network; Further Advancements for E-UTRA Physical Layer Aspects (Release 9)"; 3GPP TR 36.814 V1.5.0 Nov. 2009; pp. 1-53; Valbonne, France.

3GPP, TSG RAN WG1 Meeting #58bis; "RAN1 Chairman's Notes"; 3rd Generation Partnership Project (3GPP); Oct. 12-16, 2009; Miyazaki, Japan.

3GPP, TSG RAN WG1 Meeting #59; "RAN1 Chairman's Notes"; 3rd Generation Partnership Project (3GPP); Nov. 2009; Jeju, Korea.

3GPP, TSG-RAN WG1 #61; "Way forward on DM-RS pattern for extended CP"; Agenda item 6.3.1.4; R1-103383; 3rd Generation Partnership Project (3GPP); NMay 1-14, 2010; Montreal, Canada.

International Preliminary Report on Patentability issued in corresponding International application No. PCT/CN2010/000927, date of issuance Dec. 19, 2012.

International Search Report and Written Opinion in corresponding International Application No. PCT/CN2010/000927 mailed Jul. 21, 2011.

3GPP TSG RAN WGI meeting #61; R1-103098; "OCC mapping scheme for downlink DMRS"; May 10-14, 2010; pp. 1-6; Montreal, Canada.

Office Action in related CN Application No. 201080067432.4 dated Feb. 15, 2015 (reference previously cited in IDS dated Feb. 28, 2014).

Search Report in related CN Application No. 201080067432.4 dated Feb. 5, 2015 (references previously cited in IDS dated Feb. 28, 2014).

Extended European Search Report in corresponding European Application No. EP 10 85 3049 dated Feb. 9, 2015.

Huawei; "DMRS patterns design for extended CP"; 3GPP TSG RAN WG1 Meeting #61, R1-103099; May 10-14, 2010; pp. 1-4; Quebec, Canada.

Qualcomm Incorporated; "UE-RS Patterns for Rank 1-4 and Extended CP" 3GPP TSG-RAN WG1 #60bis; R1-102330; Apr. 12-16, 2010; pp. 1-9; Beijing, China.

Panasonic; "OCC mapping for DM-RS rank 5-8"; 3GPP TSG RAN WG1 Meeting #61; R1-102869; May 1-14, 2010; pp. 1-5; Montreal, Canada.

Japanese Examiner's Pre-Review Report in corresponding Japanese Application No. 2013-514514 dated May 22, 2015 (reference previously cited in IDS dated May 16, 2014).

* cited by examiner

METHODS AND ARRANGEMENTS FOR TRANSMITTING AND DECODING REFERENCE SIGNALS

This application is a continuation application of U.S. patent application Ser.No. 13/159,563, filed Jun. 14, 2011; which is a continuation application of International application no. PCT/CN2010/000927, filed Jun. 24, 2010; which is a continuation of International application no. PCT/CN2010/000865, filed Jun. 16, 2010, the entire teachings of which are incorporated herein by reference.

TECHNICAL FIELD

The present invention relates to methods and arrangements for transmitting a reference signal, and to methods and arrangements for decoding a reference signal.

BACKGROUND

The 3rd Generation Partnership Project (3GPP) is responsible for the standardization of the Universal Mobile Telecommunication System (UMTS) and Long Term Evolution (LTE). The 3GPP work on LTE is also referred to as Evolved Universal Terrestrial Access Network (E-UTRAN). LTE is a technology for realizing high-speed packet-based communication that can reach high data rates both in the downlink and in the uplink, and is thought of as a next generation mobile communication system relative to UMTS. In order to support high data rates, LTE allows for a system bandwidth of up to 20 MHz. LTE is also able to operate in different frequency bands and can operate in at least Frequency Division Duplex (FDD) and Time Division Duplex (TDD) modes. The modulation technique or the transmission method used in LTE is known as Orthogonal Frequency Division Multiplexing (OFDM). The first release of LTE is expected to provide peak rates of 300 Mbps, a radio-network delay of e.g. 5 ms or less, a significant increase in spectrum efficiency and a network architecture designed to simplify network operation, reduce cost, etc.

For the next generation mobile communications systems, e.g. International Mobile Telecommunications (IMT) advanced and/or LTE Advanced, which is an evolution of LTE, support for bandwidths of up to 100 MHz is being discussed. In both LTE and LTE Advanced, radio base stations are known as eNBs or eNodeBs, where "e" stands for evolved. Furthermore, multiple antennas with precoding and/or beamforming technology may be used in order to provide high data rates to user equipments (UEs). Thus, LTE and LTE Advanced both constitute examples of Multiple-Input, Multiple-Output (MIMO) radio systems. Another example of a MIMO- and OFDM based system is Worldwide Interoperability for Microwave Access (WiMAX). Since LTE Advanced is an evolution of LTE, backward compatibility is important so that LTE Advanced can be deployed in spectrum already occupied by LTE.

In LTE Advanced, also known as 3GPP Release 10, up to 8 layer transmission should be supported in order to fulfil LTE Advanced downlink spectral efficiency, 30 bps/Hz. This may be achieved by utilizing some kind of advanced antenna configuration, e.g. 8×8 high-order MIMO, where 8 transmit antennas and 8 receive antennas are used. Throughout this document, the term "antenna port" will be used rather than antenna, to emphasize that what is referred to does not necessarily correspond to a single physical antenna.

To provide context for the subsequent disclosure, a brief review of the LTE downlink physical resource structure will now be provided. In OFDM systems such as LTE, the available physical resources are divided into a time and frequency grid. The time dimension is divided into subframes, each comprising a number of OFDM symbols. In LTE and LTE Advanced, a subframe is 1 ms in length, divided into two time slots of 0.5 ms each. A guard interval, called a cyclic prefix (CP), is prepended to each OFDM symbol in order to reduce inter-symbol interference. For normal cyclic prefix (CP) length, the number of OFDM symbols per subframe is 14, which implies that time is quantized into 14 symbols during a subframe. For extended cyclic prefix length, there are 12 OFDM symbols per subframe. Frequency corresponds to subcarriers in the OFDM symbols, and the number of subcarriers varies depending on the system bandwidth used. Each box within the time-frequency grid represents a single subcarrier for one symbol period, and is referred to as a resource element. The smallest schedulable unit of resource elements is called a physical resource block (PRB), or simply a resource block (RB). In LTE and LTE Advanced, a resource block spans 12 subcarriers and 0.5 ms, i.e. 7 or 6 OFDM symbols depending on cyclic prefix length. The resource blocks are, however, allocated in pairs in the time domain. Thus, an LTE subframe of 1 ms is two resource blocks wide.

There is also a special type of LTE subframe, composed of three fields: Downlink Pilot Timeslot (DwPTS), Guard Period (GP), and Uplink Pilot Timeslot (UpPTS). This special subframe is used for downlink-to-uplink switching in TDD mode. The duration of the GP field is varied depending on how long it takes the UE to switch from receiving to sending, and also on the signal propagation time from the base station to the UE. The DwPTS field carries synchronization and user data, as well as the downlink control channel for transmitting scheduling and control information. Since the total subframe duration is fixed at 1 ms, the duration of the DwPTS and UpPTS fields are adjusted based on the duration of the GP field.

A reference signal is a known signal which is inserted at predetermined positions in the OFDM time-frequency grid. The presence of this known signal allows the UE to estimate the downlink channel so that it may carry out coherent channel demodulation. It has been agreed for LTE that up to 8 UE-specific reference signals (RS) will be introduced for the purpose of channel demodulation. The UE-specific reference signals are also called demodulation RS or DM-RS. Thus, each antenna port transmits one DM-RS, which is specific to that antenna port as well as to the UE that the transmission is directed to.

Reference signals are generally transmitted according to a predefined pattern in time and frequency, so that the UE knows where to find the signals. A prior art DM-RS pattern with normal cyclic prefix (CP), supporting up to rank 8, is shown in FIG. 1. The expression "rank", or transmission rank, refers to the number of independent data streams, or spatial layers, which may be reliably transmitted over a wireless channel. In the present context, the rank may be interpreted as the maximum number of transmit antenna ports that are supported.

FIG. 1 shows a time-frequency grid for a normal subframe, i.e. not a special subframe. Each row in the grid represents a subcarrier, and each column represents an OFDM symbol. The first three OFDM symbols are rendered in light gray color, to indicate that these symbols may be reserved for control signalling. The grid covers two LTE time slots, as explained above. The DM-RS pattern of FIG. 1 supports a total of 8 DM-RS antenna ports. The pattern exhibits a DM-RS overhead of 12 RE per layer; that is to say, each antenna port will use 12 REs per subframe for transmitting reference signals. For instance, one antenna port will transmit reference signals in the REs represented by the 12 squares filled with slanted lines in FIG. 1. The 8 DM-RS antenna ports are separated by a combination of CDM and FDM, as will be further explained below. It should be understood that other kinds of reference signals may also be transmitted; however, these have been omitted from FIG. 1 for reasons of simplicity.

Up to two code division multiplexing (CDM) groups are reserved for DM-RS, where each CDM group consists of 12 resource elements (RE) per physical resource block (PRB) pair. In the context of this disclosure, a CDM group is a group of resource elements which are used for multiplexing reference signals from a number of antenna ports using code division multiplexing. Thus, the 12 squares with slanting lines in FIG. 1 form one CDM group, and the 12 squares with horizontal lines form another CDM group. Each CDM group supports a maximum of four layers, i.e. a maximum of four antenna ports. The two CDM groups are multiplexed by FDM; in other words, the REs belonging to the first and second CDM groups are transmitted on different frequencies, i.e. subcarriers.

There is one CDM cluster in each time slot, as indicated by the thick black outlines 110, 120 in FIG. 1.

Furthermore, each CDM group comprises three CDM subgroups, i.e. groups of resource elements that share the same subcarrier. For example, the four squares with slanted lines in the top row of the time-frequency grid in FIG. 1 form one CDM subgroup, as indicated by the thick gray outline 130. Two further subgroups are indicated by thick gray outlines 140 and 150. Each CDM subgroup comprises 4 REs in the time domain, and in each CDM subgroup, up to four DM-RS antenna ports may be multiplexed.

The multiplexing of reference signals within a CDM subgroup is achieved by applying orthogonal cover codes (OCC) across the time domain. An OCC is a set of codes which all have zero cross-correlation. Thus, two signals encoded with two different codes from the set will not interfere with one another. An example of an OCC is a Walsh code. Walsh codes are defined using a Walsh matrix of length N, i.e. having N columns. Each row in the Walsh matrix is one length-N Walsh code. For example, the Walsh matrix of length-4 is:

$$W = \begin{pmatrix} 1 & 1 & 1 & 1 \\ 1 & -1 & 1 & -1 \\ 1 & 1 & -1 & -1 \\ 1 & -1 & -1 & 1 \end{pmatrix}$$

Each row in this matrix forms one code of length 4, i.e. the codes are [1, 1, 1, 1], [1, −1, 1, −1], [1, 1, −1, −1] and [1, −1, −1, 1]. These four codes are all orthogonal with respect to each other. The individual "1":s and "−1":s of each code will be referred to as "code elements" in the following.

Although Walsh codes will be used throughout this disclosure to exemplify the invention, it should be understood that any OCC may be used. When this disclosure refers to "applying an orthogonal cover code" or "transmitting a signal using an orthogonal cover code" this should be understood as referring to one code out of a set of mutually orthogonal codes, e.g. one row from the Walsh matrix.

Each antenna port transmits one reference signal within the CDM subgroup, by applying an orthogonal cover code to the signal. If four antenna ports are multiplexed within a CDM subgroup, a length-4 OCC will be used, and each of the four antenna ports will use a different code from the set. This allows the reference signals to be separated and decoded on the receiver side.

The concept of OCC mapping has been introduced for dual layer beamforming, with the aim to reach full peak power randomization, which is expected to improve eNodeB side power utilization. OCC mapping means that the code elements in each OCC are mapped to reference elements in a specific pattern, or a specific order. One example of an OCC mapping design, which uses length-2 Walsh codes, is shown in FIG. 2. In the lower right corner of FIG. 2, the length-2 Walsh matrix is shown. Since a length-2 code is used, two antenna ports are multiplexed in each CDM subgroup in this example. Each antenna port will transmit two reference signals; one in the first time slot, and one in the second time slot. Layer 1, i.e. the first antenna port, uses the code from the first row in the Walsh matrix, i.e. [+1, +1]. Layer 2, i.e. the second antenna port, uses the code from the second row, [+1, −1]. Index a corresponds to the first code element, and index b corresponds to the second code element of each code. Thus, in the second code [+1, −1], index a corresponds to +1 and b corresponds to −1. Each antenna port will encode its reference signal by applying the code elements in the order indicated by the pattern of a:s and b:s in the time-frequency grid of FIG. 2.

An example may help illustrate the encoding process. Focusing on the first CDM subgroup 210, the first antenna port will transmit two reference signals, denoted X1 and X2, in this CDM subgroup. The second antenna port will also transmit two reference signals, denoted Y1 and Y2, in the same CDM subgroup 210. The first antenna port will encode its first reference signal, X1, in OFDM symbols 6 and 7 by applying the code elements [a, b], corresponding to [+1, +1], since the first antenna port uses the first Walsh code. Thus, the first antenna port will transmit [X1, X1]. The second antenna port will also encode its first reference signal, denoted Y1, in OFDM symbols 6 and 7. It will apply the code elements [a, b] from the second Walsh code, i.e. [+1, −1]. Therefore, the second antenna port will transmit [Y1, −Y1]. These signals will be superimposed, so that the resulting signal transmitted in OFDM symbols 6 and 7 is [X1+Y1, X1−Y1].

However, in the second CDM subgroup 220, i.e. the sixth row of the time-frequency grid, the two antenna port will encode their reference signals by applying the code elements in reverse order. Focusing again on OFDM symbols 6 and 7, the first antenna port will use the code [+1, +1], i.e. [X1, X1]—effectively the same code again, as reversing the code elements makes no difference in this case—but the second antenna port will use the code [−1, +1], i.e. [−Y1, Y1]. Thus, the resulting signal transmitted in OFDM symbols 6 and 7 in the second CDM subgroup 220 will be [X1−Y1, X1+Y1].

For completeness, it is pointed out that each antenna port will also transmit a second reference signal, denoted X2 and Y2, respectively, in OFDM symbols 13 and 14. The code pattern is the same as in the previous example and the resulting signal transmitted in OFDM symbols 13 and 14 may be derived in the same way.

It is pointed out that in this example, only CDM group 1 is allocated. Also, the mapping pattern is different in even PRBs and odd PRBs. Full peak power randomization can be reached between two adjacent PRBs. To understand why, consider the special case where reference signals X1 and Y1 are the same, i.e. X1=X2. Using the same example as above, the signal transmitted in symbols 6 and 7 of the first CDM subgroup 210 will be [X1+X1, X1−X1], i.e. [2X1, 0]. In the second CDM subgroup 220, the resulting signal will be [X1−X1, X1+X1], i.e. [0, 2X1]. Thus, in OFDM symbol 6, the signal 2X1 will be transmitted in the first CDM subgroup 210, and 0 will be transmitted in the second CDM subgroup 220. In OFDM symbol 7, the situation is the reverse, i.e. 0 in the first CDM subgroup 210, and 2X1 in the second CDM subgroup 220. This means that the total transmit power level will be about the same in OFDM symbol 6 as in symbol 7. In other words, the transmit power level is balanced between OFDM symbols, which implies that high peaks in transmit power levels between symbols may be avoided.

As mentioned above, the use of orthogonal cover codes enables the receiver to decode the reference signals in order to estimate the channel. Thus, at the UE side, per port channel estimation is performed by using the proper OCC. In other words, each reference signal is decoded, or despread, using the corresponding OCC that was used to encode the signal. A different length OCC is applied for channel estimation depending on how many layers are multiplexed in one CDM group. Two example cases with two and four layers, respectively, will now be described with reference to FIGS. 3(a) and 3(b).

When up to two layers are multiplexed in one CDM group, a length-2 OCC can be used for each CDM cluster 340, 350 in both slots, as shown in FIG. 3(a). This means that the Doppler impact introduced by mobility can be well captured by weighting two CDM clusters.

When more than two layers are multiplexed in one CDM group, a length-4 OCC has to be used across both clusters in one subframe, as illustrated in FIG. 3(b). Length-4 OCC is typically used for high rank cases, i.e. four or more antenna ports.

At the UE side, one common strategy for performing DM-RS based channel estimation is to apply a 2×1D filter method per PRB, i.e. first a frequency domain filter and then a time domain filter. The basic principle is shown in FIG. 4. Frequency domain filtering and time domain filtering are performed based on respective inputs of delay spread, Doppler, and SNR. Due to uncertain resource allocation and bandwidth, the frequency domain filter has been found to require a much longer processing time than the time domain filter. To some extent, the time required by the frequency domain filter becomes a bottleneck which prevents speeding up the processing on channel estimation and further detection, and this may impact the overall detection latency.

When performing channel estimation with a length-2 OCC, as shown in FIG. 3(a), we notice that slot-by-slot channel estimation can be exploited. That is to say, channel estimation in the $1^{st}$ slot can be performed first before the reception of the whole subframe. The reason for this is that a reference signal is transmitted in two consecutive REs, which are comprised in the same time slot. In other words, all the information required to decode the reference signal is available within a single time slot. This allows the processing time taken by the frequency domain filter in the first slot to be reduced, since the information received in the first slot can be processed during the time the second slot is received. This may result in a low latency channel estimator.

However, in 3GPP Release 10, a length-4 OCC is used to support multiplexing of up to four layers in each CDM group, as has been explained above. When performing channel estimation with length-4 OCC, as shown in FIG. 3(b), a length-4 OCC is used instead of length-2 OCC. However, length-4 OCC despreading cannot be performed until the whole subframe is received. This is because each reference signal is spread across four REs, which are distributed across two time slots (see FIG. 1). Thus, in the conventional scheme, channel estimation cannot be performed until both time slots are received. This means that processing of the first slot can not be performed in parallel with receiving the second slot, and additional time will be required, particularly by the frequency domain filter. Consequently, there is a risk of higher latency when performing channel estimation in the length-4 OCC case, since slot-by-slot channel estimation is not possible, as for the length-2 OCC case. In addition, in case of a length-4 OCC, the Doppler impact can not be well overcome since code despreading needs to be considered in both slots.

Furthermore, the OCC mapping pattern shown in FIG. 2 achieves full peak power randomization over two RBs, as described above, but only for normal cyclic prefix (CP) length. Thus, there is a need for a mechanism for enabling full peak power randomization also in the extended CP case, and/or for special subframes comprising the DwPTS field (Downlink Pilot Timeslot).

SUMMARY

An object of some embodiments of the invention is to provide a mechanism for reducing latency when performing channel estimation.

A further object of some embodiments is to provide a mechanism for enabling full peak power randomization in the extended CP case, and/or for special subframes comprising the DwPTS field (Downlink Pilot TimeSlot).

In some embodiments of this invention, the object is achieved by providing a low complexity length-4 OCC mapping pattern for normal cyclic prefix (CP) with a simple extension from length-2 OCC mapping, which essentially maintains backward compatibility with prior art mapping patterns, such as the pattern defined in 3GPP Release 9, and provides per-PRB 2D-orthogonality to enable per-slot processing.

In addition, some embodiments provide a low complexity length-2 OCC mapping pattern for extended CP by re-using same mechanism applied in 3GPP Release 9, which on one hand can obtain full peak power randomization within a PRB and on the other hand maintains the per-PRB 2D-orthogonality property.

In some embodiments of this invention, an OCC mapping is provided for both normal CP and extended CP, where a length-4 OCC mapping is proposed for normal CP and length-2 OCC mapping is proposed for extended CP.

In some embodiments, a method is provided in a radio network node for transmitting a reference signal over an antenna port, wherein the reference signal is transmitted in a code division multiplexing, CDM, group. The CDM group comprises at least two CDM subgroups, each CDM subgroup being transmitted on a different subcarrier. Each CDM subgroup comprises resource elements. In a first step, the radio network node transmits the reference signal over a first CDM subgroup using an orthogonal cover code. The first CDM subgroup comprises resource elements in a first time slot and a subsequent time slot. In a further step, the radio network node transmits the reference signal over a second CDM subgroup using a permutation of the orthogonal cover code. The second CDM subgroup comprises resource elements in the first time slot and the second time slot. The permutation of the orthogonal cover code is selected in such a way as to enable decoding of the reference signal in the frequency domain, by applying the orthogonal cover code only to the resource elements in the CDM group which are comprised in the first time slot.

In some embodiments, a method is provided in a user equipment for decoding a reference signal which is received in a code division multiplexing, CDM, group. The CDM group comprises at least two CDM subgroups, each CDM subgroup being received on a different subcarrier. Each CDM subgroup comprises resource elements in a first time slot and a subsequent time slot. In a first step, the UE receives, in a first time slot, a first set of resource elements comprised in a first CDM subgroup, and a second set of resource elements comprised in a second CDM subgroup. The UE decodes the reference signal by applying an orthogonal cover code to the first and second sets of resource elements.

In some embodiments, a method is provided in a radio network node for transmitting reference signals, wherein a first reference signal is transmitted in a first code division multiplexing, CDM, group, and a second reference signal is transmitted in a second CDM group. Each CDM group comprises at least two CDM subgroups, and each CDM subgroup comprises resource elements. The radio network node transmits the first reference signal over a first CDM subgroup using an orthogonal cover code, and over a second CDM subgroup using a permutation of the orthogonal cover code. Furthermore, the radio network node transmits the second reference signal over a third CDM subgroup using the orthogonal cover code, and over a fourth CDM subgroup using the permutation of the orthogonal cover code. The permutation of the orthogonal cover code is selected in such a way as to enable peak power randomization within a single resource block.

In particular embodiments of this invention, an orthogonal cover code is permutated between different CDM subgroups. By permutating the code, i.e. changing the order of the code elements, it is ensured that each code element will be applied at least once to a certain reference signal within a single subframe. This implies that a UE will receive enough information in the first subframe to be able to decode the reference signal; it may do so by applying the OCC in the frequency domain instead of, or in addition to, the time domain. Thus, per-PRB 2D-orthogonality may be exploited to enable per-slot processing.

A further advantage of at least some embodiments is low complexity implementation. This is due to use of a reference signal pattern which is an extension of or reuse of existing length-2 OCC mapping.

A yet further advantage of some embodiments is that backward compatibility with 3GPP Release 9 mapping pattern is maintained for the normal CP case.

Another advantage is that peak power randomization may be obtained, either fully or partially, by shifting and/or permutating the orthogonal cover code. In some particular embodiments, full peak power randomization is achieved over two PRBs. Other embodiments obtain peak power randomization within a single PRB.

ABBREVIATIONS

3GPP 3rd Generation Partnership Project
CDM code division multiplexing
DwPTS Downlink Pilot Timeslot
DM-RS Demodulation reference signals
FDD frequency division duplex
FDM frequency division multiplexing
LTE Long term evolution
MIMO Multiple-Input, Multiple-Output
OCC orthogonal cover code
OFDM orthogonal frequency division multiplex
PRB physical resource block
TDD time division duplex

DETAILED DESCRIPTION

It should be noted that although terminology from 3GPP LTE has been used in this disclosure to exemplify the invention, this should not be seen as limiting the scope of the invention to only the aforementioned system. Other wireless systems, such as WiMax, may also benefit from exploiting the ideas covered within this disclosure.

In OCC design, three criteria are commonly applied: Backward compatibility, 2D-orthogonality property, and peak power randomization. One or more of these criteria will be satisfied by at least some of the following embodiments.

As explained above, a length-4 OCC may be used to support multiplexing of up to four layers, i.e. antenna ports, in each CDM group. If two CDM groups are used, a total of up to eight antenna ports can be supported, i.e. four antenna ports in each CDM group. However, use of a length-4 OCC will cause each reference signal to be spread across four resource elements in two time slots. This leads to increased detection latency, because the UE must wait for the second time slot before it can start decoding the reference signals.

In some embodiments, latency may be reduced by utilizing a modified OCC mapping pattern, which makes it possible to decode the reference signals based on the information in the first time slot, by applying the orthogonal cover code in the frequency domain over two or more CDM subgroups, instead of, or in addition to, applying the OCC in the time domain within a single CDM subgroup.

Figure 5:
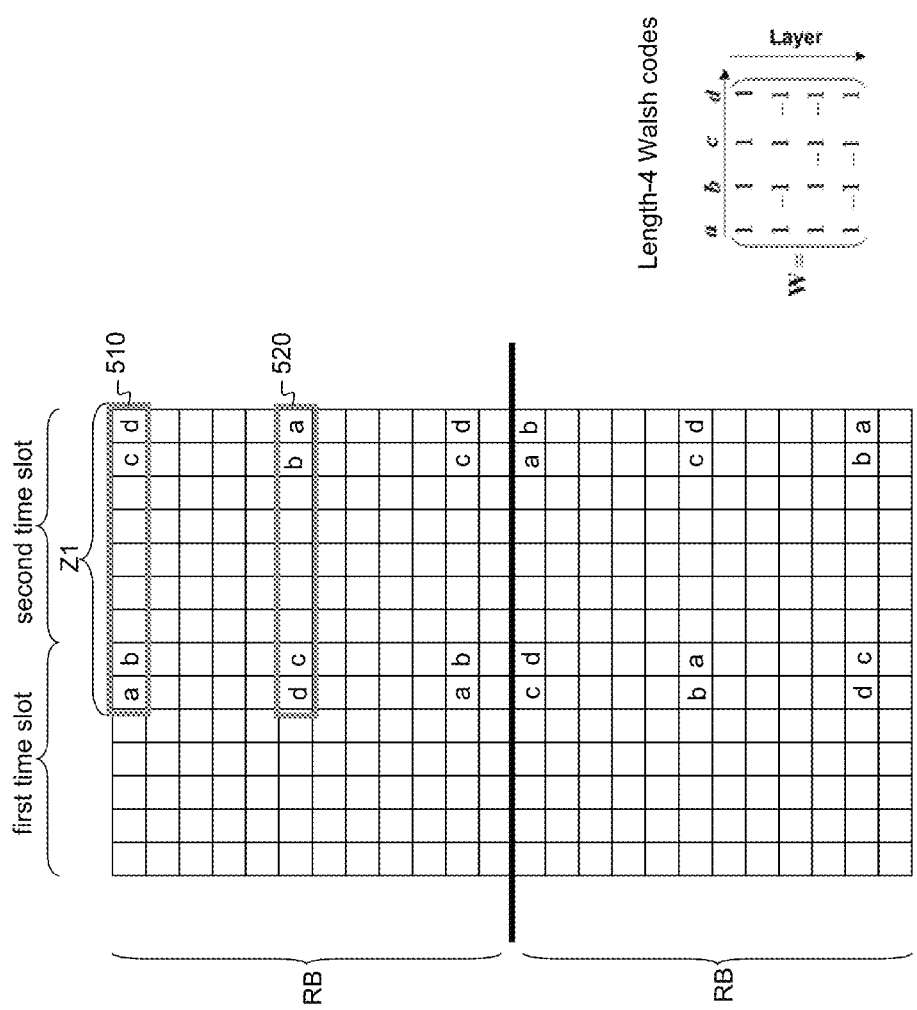
FIG. 5 is a schematic diagram illustrating a reference signal pattern.

A method for transmitting a reference signal in a radio network node according to some embodiments will now be described with reference to FIG. 5 and FIG. 6. FIG. 5 is a time-frequency grid illustrating an OCC mapping pattern, where a length-4 OCC is constructed across two adjacent CDM subgroups in the frequency domain by OCC mapping.

Figure 1:
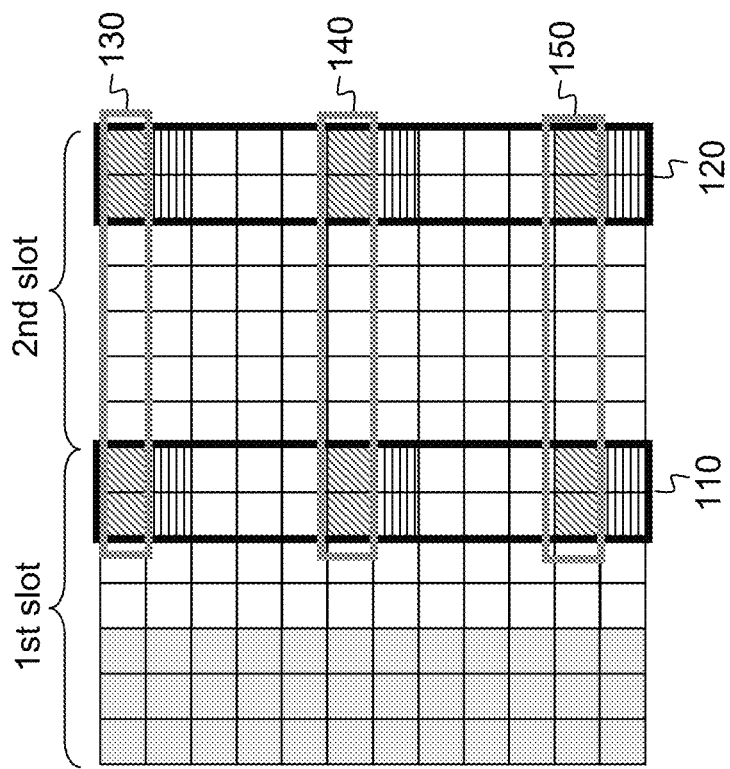
FIG. 1 is a schematic diagram illustrating a reference signal pattern.
Figure 2:
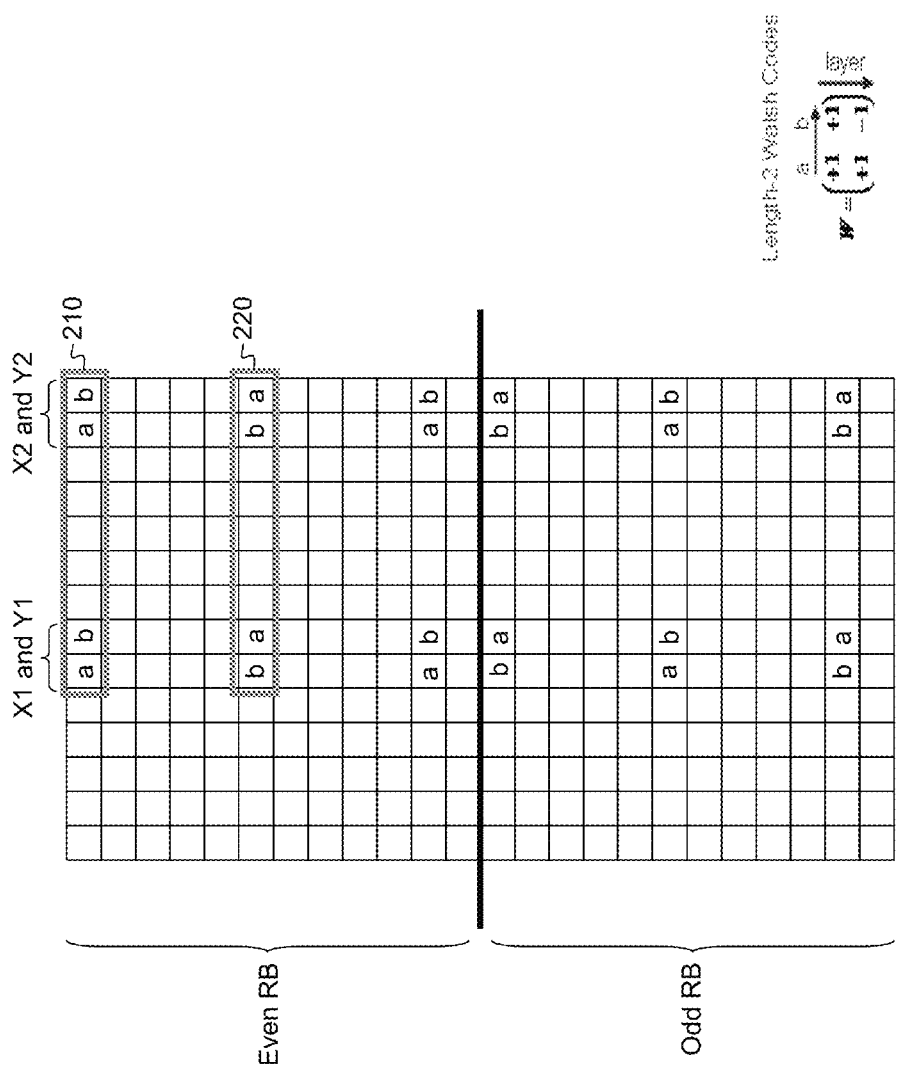
FIG. 2 is a schematic diagram illustrating a reference signal pattern.
Figure 3:
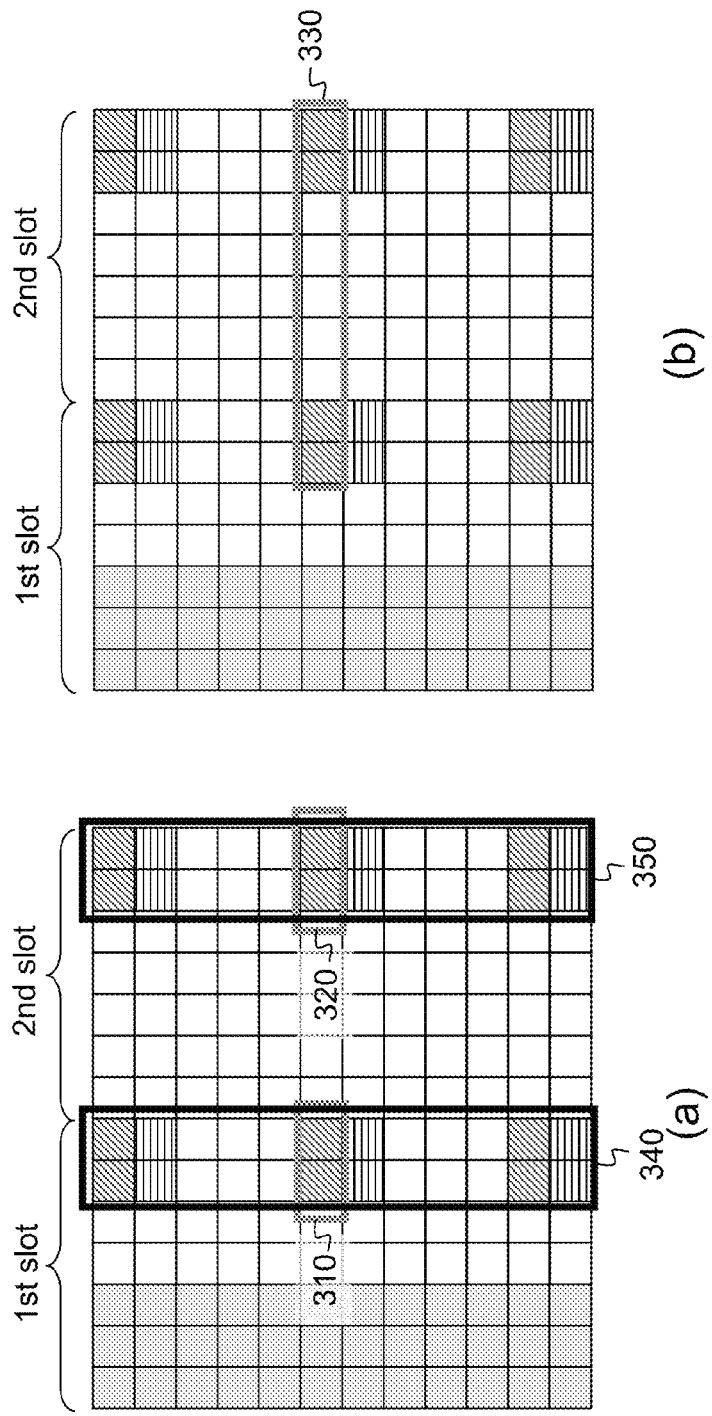
FIG. 3 is a schematic diagram illustrating a reference signal pattern.
Figure 4:
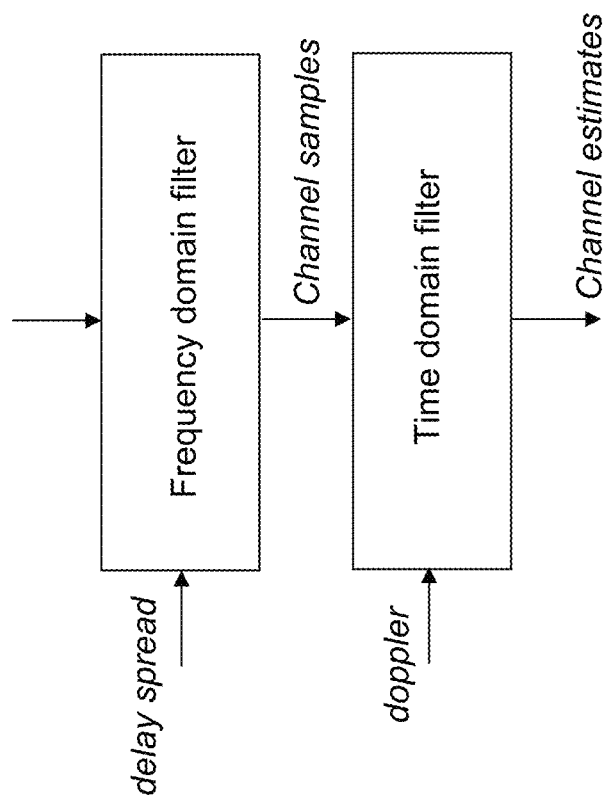
FIG. 4 is a diagram illustrating a part of the channel estimation procedure.

The letters a, b, c and d in the grid correspond to different code elements in a Walsh code, similarly to the example described in connection with FIG. 2 above. The length-4 Walsh matrix is displayed to the right of the time-frequency grid. Since a length-4 code is used in this example, four letters are needed to denote the different code elements. For example, the second antenna port would use the Walsh code from the second row of the matrix, [1, −1, 1, −1] to encode its reference signal, and the letters a, b, c, and d corresponds to the different code elements in this row, i.e. a=1, b=−1, c=1, and d=−1. The third antenna port would use code in the third row, [1, 1, −1, −1], i.e. a=1, b=1, c=−1, and d=−1.

Figure 6:
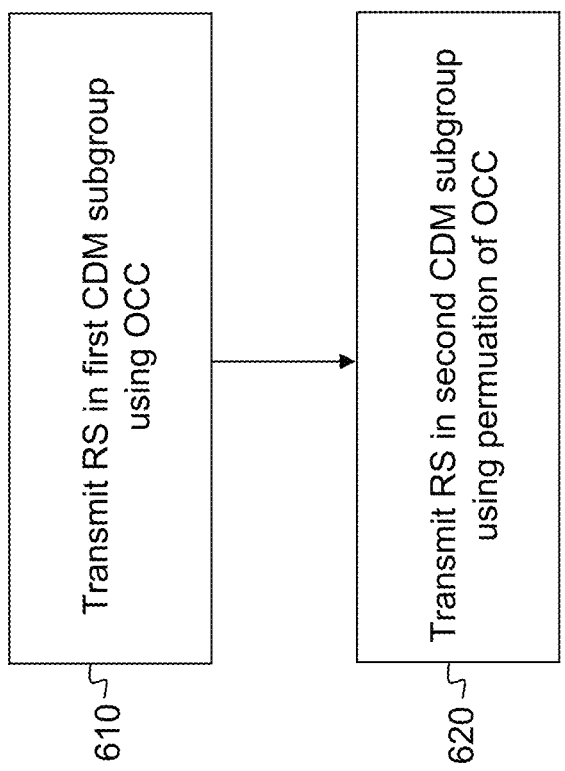
FIG. 6 is a flow chart illustrating an example method.

FIG. 6 is a flowchart showing the steps of the example method for transmitting a reference signal according to the pattern of FIG. 5. The method steps will be described from the point of view of a single antenna port. However, it is pointed out that signals from up to four antenna ports may be multiplexed within each CDM subgroup, by applying different orthogonal cover codes to each reference signal as described above. Thus, it should be understood that up to three additional antenna ports may be performing the following method steps at the same time; however, each antenna port will be using its own specific reference signal and OCC.

Thus, according to this embodiment, a radio network node transmits a reference signal in a CDM group, which comprises three CDM subgroups. Each CDM subgroup is transmitted on a different subcarrier. In FIG. 5, the four squares marked a, b, c, and d in the uppermost row in the grid, i.e. the first subcarrier, form one CDM subgroup 510. The corresponding four squares in the sixth row form a second CDM subgroup 520, and the four squares in the twelfth group form a third CDM subgroup. It should, however be understood that any number of CDM subgroups from two, up to the available number of subcarriers, may be used to transmit the reference signal. Each CDM subgroup comprises four resource elements.

Referring now to FIG. 6, in a first step 610, the radio network node transmits the reference signal over a first CDM subgroup 510 using an orthogonal cover code. The first CDM subgroup 510, which is transmitted on the first subcarrier, i.e. the top row of the grid in FIG. 5, comprises resource elements in a first time slot and a subsequent time slot. As can be seen in FIG. 5, the REs marked a and b are comprised in the first time slot, and the REs marked c and d are comprised in the second time slot.

In particular embodiments, the OCC is a length-4 Walsh code. As a specific example, let us consider the transmission from the third antenna port. The third antenna port is transmitting a reference signal, which will be denoted Z1, in the first CDM subgroup 510. The code [1, 1, −1, −1] will be used, and the code elements will be applied in the order a, b, c, d—i.e. 1, 1, −1, −1. Thus, the signal transmitted by the third antenna port in the first CDM subgroup 510 will be [Z1, Z1, −Z1, −Z1].

Then, the radio network node transmits the reference signal over a second CDM subgroup 520 in step 620. The second CDM subgroup 520 also comprises resource elements in the first time slot and the second time slot. In FIG. 5, the second CDM subgroup 520 corresponds to the REs in the sixth subcarrier, i.e. sixth row, that are marked d, c, b, a. The same reference signal is transmitted in the second CDM subgroup 520 as in the first CDM subgroup 510, i.e. using the same specific example as above, the third antenna port will transmit reference signal Z1. However, in the second CDM subgroup 520, the reference signal is transmitted using a permutation of the orthogonal cover code. That is to say, the code elements in the OCC are applied in a different order in the second CDM subgroup 520, compared to the first CDM subgroup 510. The permutation of the orthogonal cover code is selected in such a way as to enable decoding of the reference signal in the frequency domain, by applying the orthogonal cover code only to resource elements in the CDM group which are comprised in the first time slot.

To understand why this is possible, consider that in the first CDM subgroup 510, code elements a and b are applied in the first time slot. In the second CDM subgroup 520, however, code elements d and c are applied in the first time slot, due to the permutation of the OCC. This means that the signal encoded with all four elements of the OCC—a, b, c, and d—will be received within the first time slot. Thus, the UE receives all the information it needs to decode the RS by combining the a and b from the first CDM subgroup 510 with the c and d from the second CDM subgroup 520.

Going back to our specific example of the third antenna port, in the second CDM subgroup 520 the third antenna port will transmit reference signal Z1 using the permutation d, c, b, a, i.e. −1, −1, 1, 1. Thus, the signal transmitted in the second CDM subgroup 520 is [−Z1, −Z1, Z1, Z1]. Now, recall that in the first CDM subgroup 510, the transmitted signal was [Z1, Z1, −Z1, −Z1]. Thus, the last two elements in the first CDM subgroup 510 are equal to the first two elements in the second CDM subgroup 520. Thus, in the first time slot, the UE will receive [Z1, Z1] in the first CDM subgroup 510 and [−Z1, −Z1] in the second CDM subgroup 520. By combining the signals from the first and second CDM subgroups in the first time slot, the receiving UE obtains [Z1, Z1, −Z1, −Z1]. This is the same signal that was transmitted in the first CDM subgroup 510 over both time slots, and therefore the UE is now able to decode the reference signal Z1, even if it has not yet received the second time slot.

Consequently, the permutation of the OCC in the present example enables per-slot decoding of reference signals. Stated another way, code despreading of a length-4 OCC may be processed within each slot. This provides the possibility of slot-by-slot channel estimation. As has been explained above, in this embodiment code despreading of length-4 OCC is no longer processed in time domain, but in frequency domain over two CDM subgroups, e.g. two adjacent CDM subgroups. However, it is still possible perform code despreading in the time domain, in addition to the frequency domain, when necessary.

In an alternative of this embodiment, the permutation comprises applying the code elements that were applied to the REs in the second time slot in the first CDM subgroup 510 to the REs in the first time slot in the second CDM subgroup 520, and vice versa. That is to say, if elements a and b were applied in the first time slot, and c and d were applied in the second time slot in the first CDM subgroup 510, then elements a and b will be applied in the second time slot, and c and d in the first time slot, in the second CDM subgroup 520.

In another alternative, the permutation comprises applying the code elements in reverse order in the second CDM subgroup 520. That is to say, if the order a, b, c, d was used in the first CDM subgroup 510, the reverse order d, c, b, a will be used in the second CDM subgroup 520.

A further method for transmitting a reference signal in a radio network node according to some embodiments will now be described with reference to the pattern shown in FIG. 7, and the flowchart of FIG. 8.

Figure 7:
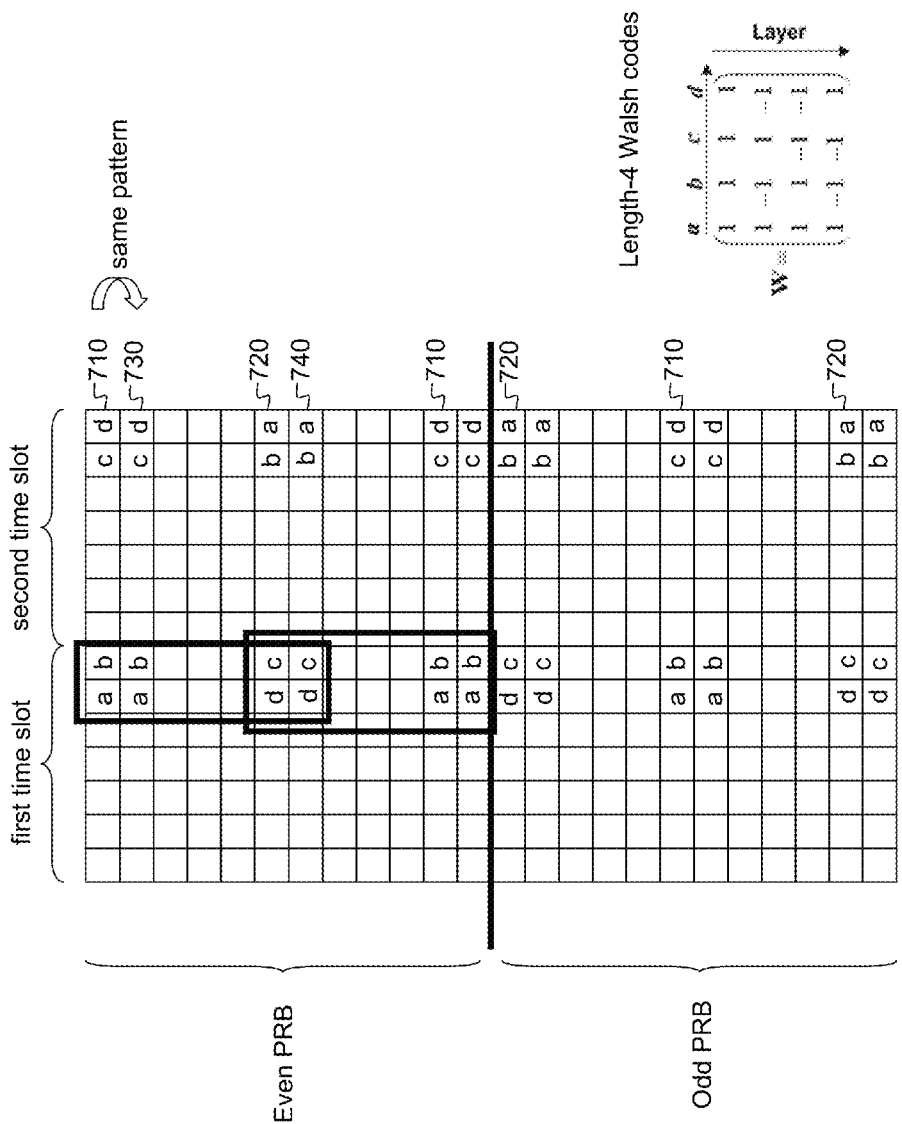
FIG. 7 is a schematic diagram illustrating a reference signal pattern.

In the OCC mapping illustrated in FIG. 7, the same pattern is used for two CDM groups. As in the previous example, length-4 Walsh Codes are used for OCC allocation. The pattern for the first CDM group, i.e. subcarriers 1, 6, and 11 of the first RB, is the same as in the previous example. However, in this example, a second CDM group is used, comprising subcarriers 2, 7, and 12 of the first RB. Thus, up to eight antenna ports may be supported in this example; four in the first CDM group, and four in the second CDM group. Each antenna port will transmit one reference signal in each CDM subgroup, and the reference signal is spread across four REs in the time domain using a length-4 Walsh code.

Figure 8:
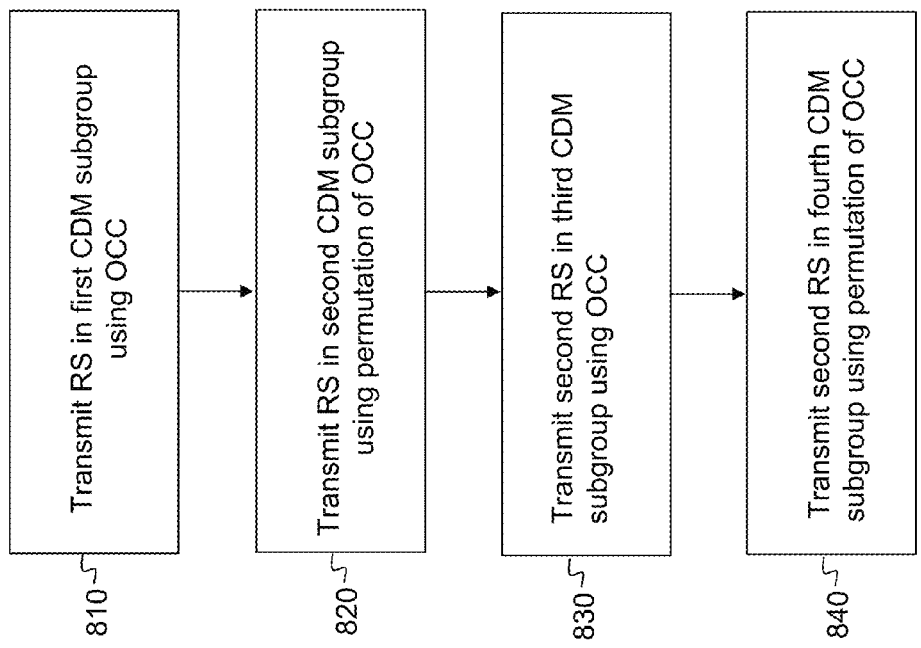
FIG. 8 is a flow chart illustrating an example method.

Referring now to FIG. 8, in a first step 810, the radio network node transmits the reference signal over a first CDM subgroup 710 using an orthogonal cover code. The first CDM subgroup 710, which is transmitted in the first subcarrier, i.e. the top row of the grid in FIG. 7, comprises resource elements in a first time slot and a subsequent time slot. As can be seen in FIG. 7, the REs marked a and b are transmitted in the first time slot, and the REs marked c and d are transmitted in the second time slot.

In step 820, the radio network node transmits the reference signal over a second CDM subgroup 720, which also comprises resource elements in the first time slot and the second time slot. In FIG. 7, the second CDM subgroup 720 corresponds to the REs in the sixth subcarrier, i.e. sixth row, that are marked d, c, b, a. The same reference signal is transmitted in the second CDM subgroup 720 as in the first CDM subgroup 710. However, in the second CDM subgroup 720, the reference signal is transmitted using a permutation of the orthogonal cover code. That is to say, the code elements in the OCC are applied in a different order in the second CDM subgroup 720, compared to the first CDM subgroup 710. The permutation of the orthogonal cover code is selected in such a way as to enable decoding of the reference signal in the frequency domain, by applying the orthogonal cover code only to the resource elements in the CDM group which are comprised in the first time slot.

The method further comprises transmitting a second reference signal over a second antenna port in a second CDM group. The second CDM group comprises at least two CDM subgroups, each CDM subgroup being transmitted on a different subcarrier. Each CDM subgroup comprises four resource elements. The transmission of the second reference signal comprises a further step 830, wherein the network node transmits the second reference signal over a third CDM subgroup 730, e.g. the second subcarrier, using the same orthogonal cover code that was applied to the first RS in the first CDM subgroup 710. The third CDM subgroup 730 comprises resource elements in a first time slot and a subsequent time slot.

The transmission of the second reference signal further comprises a step 840, wherein the network node transmits the second reference signal over a fourth CDM subgroup 740, e.g. the $7^{th}$ subcarrier, using the same permutation of the orthogonal cover code that was applied to the first RS in the second CDM subgroup 720. The fourth CDM subgroup 740 comprises resource elements in the first time slot and the subsequent time slot.

In one alternative of this embodiment, the permutation comprises applying the code elements that were applied to the REs in the second time slot in the first CDM subgroup 710 to the REs in the first time slot in the second CDM subgroup 720, and vice versa. That is to say, if elements a and b were applied in the first time slot, and c and d were applied in the second time slot in the first CDM subgroup, then elements a and b will be applied in the second time slot, and c and d in the first time slot in the second CDM subgroup 720.

In another alternative, the permutation comprises applying the code elements in reverse order in the second CDM subgroup 720. That is to say, if the order a, b, c, d was used in the first CDM subgroup 710, the reverse order d, c, b, a will be used in the second CDM subgroup 720.

In an alternative, the first CDM subgroup (710) is repeated an equal number of times as the second CDM subgroup (720) over two resource blocks. For instance, in the pattern shown in FIG. 7, the first CDM subgroup (710) is transmitted three times over the course of two resource blocks, and the second CDM subgroup (720) is also transmitted three times. This way, peak power randomization is achieved over two consecutive PRBs. It is pointed out that this alternative may also be applied to the pattern described in connection with FIGS. 5 and 6 above, where only one CDM group is used.

In some further alternatives, the third CDM subgroup (730) is repeated an equal number of times as the fourth CDM subgroup (740) over two resource blocks. This further improves the peak power randomization, analogously to the alternative described above.

As explained above, the same pattern is used in both CDM groups in this example, which provides for a low-complexity implementation. Other key characteristics of this embodiment are:
  Low complexity implementation with simple extension to the existing length-2 OCC mapping. That is to say, in case of rank 1-2, when c and d equals to a and b, respectively, the pattern is the same as the prior art length-2 OCC mapping. This also implies that the length-2 OCC mapping pattern is backward compatible when only two layers in CDM group 1 are allocated.
  Each CDM group can provide per-PRB 2D-orthogonality to enable per-slot processing, as described above.
  Partial peak power randomization may be reached. In the present example, peak power randomization is achieved across two consecutive PRBs.
  The pattern is also applicable to the DM-RS pattern of DwPTS.

Figure 8A:
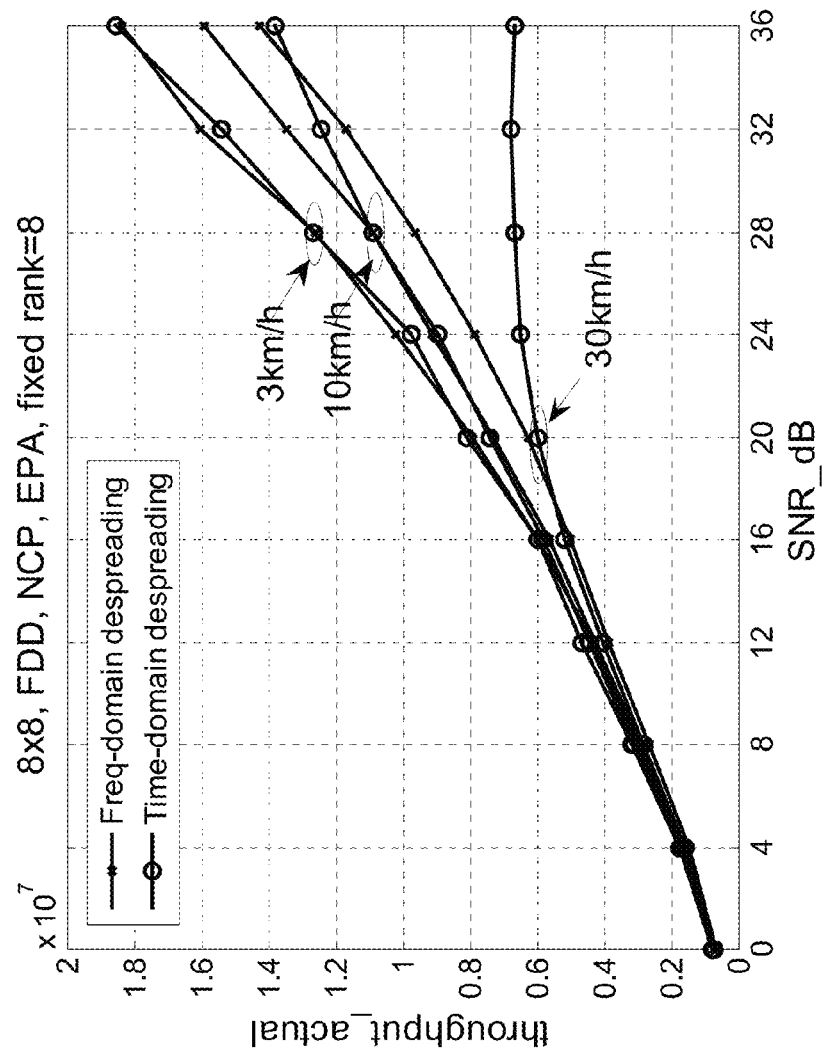
FIG. 8a is a diagram showing a performance comparison between different methods.

The diagram in FIG. 8a provides a performance comparison between the present example method were despreading is performed in the frequency domain, and the prior art method of despreading in the time domain. We note that the two methods are expected to achieve similar performance in 3 km/h but as the speed increases, the frequency domain method performs better and a significant gain can be obtained. So, two advantages of frequency domain method may be expected: 1) processing time can be efficiently reduced by enabling slot-by-slot processing, especially for high rank transmission, i.e. two slots can be independently processed; 2) performance may be improved by taking Doppler impact into account between two slots, i.e. by weighting $2^{nd}$ slot using proper Doppler factor. In principle, in high rank transmission, a less frequency selective channel is expected to support this feature.

A further example method for transmitting a reference signal in a radio network node will now be described with reference to the pattern shown in FIG. 9, and the flowchart of FIG. 10.

Figure 9:
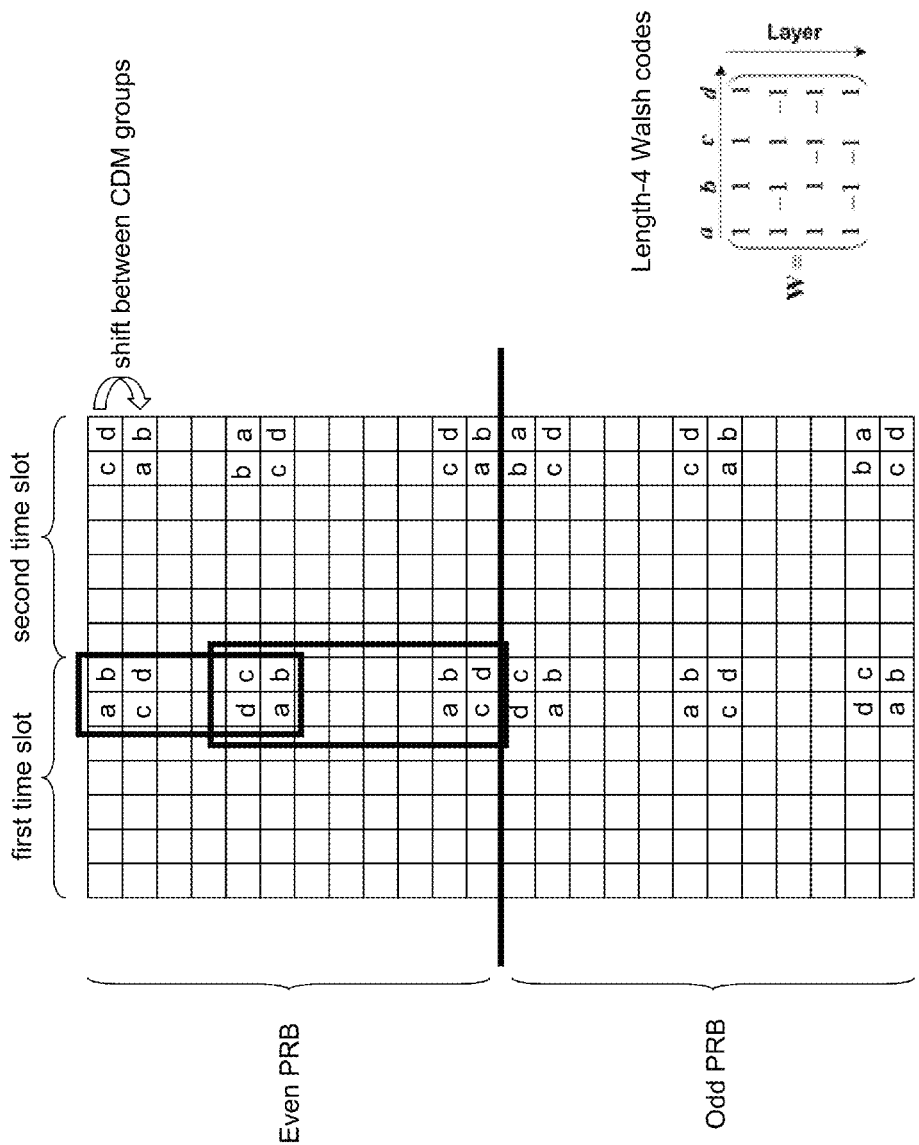
FIG. 9 is a schematic diagram illustrating a reference signal pattern.

In the OCC mapping shown in FIG. 9, a different OCC mapping is used for two CDM groups, with an CDM group-specific shift between the two groups. Here, as in the previous example, length-4 Walsh Codes are used for OCC allocation.

Figure 10:
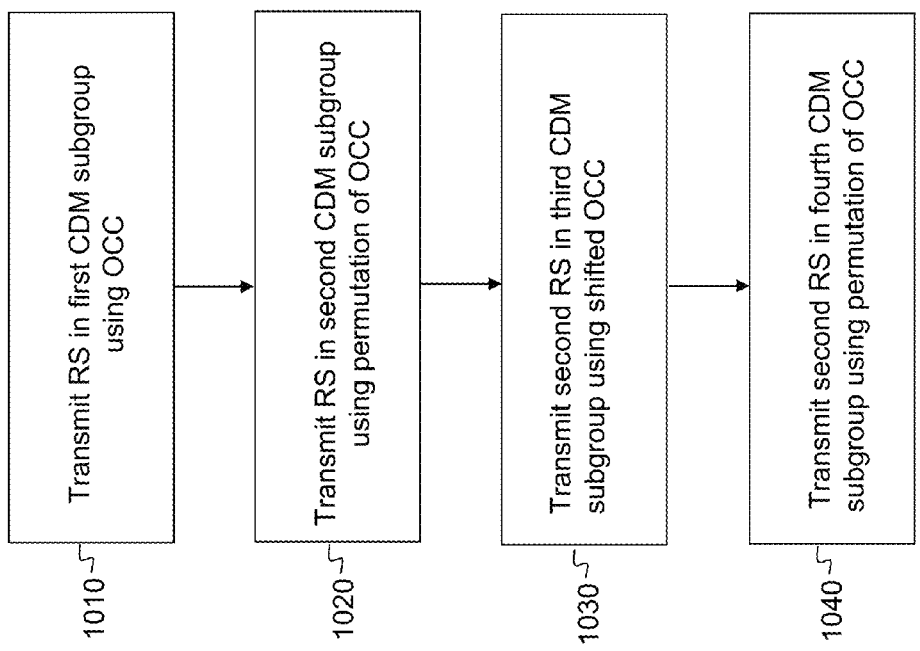
FIG. 10 is a flow chart illustrating an example method.

The method steps of FIG. 10 essentially correspond to those of FIG. 8. However, one difference is that when the third CDM subgroup is transmitted in step 1030, this is done using a shifted version of the OCC that was used in the first subgroup. For instance, the code elements applied in the first CDM subgroup, i.e. first subcarrier, in FIG. 9 are a, b, c, d. However, in the third CDM subgroup, i.e. second subcarrier, the code elements are applied in a shifted order, as c, d, a, b.

In addition to the advantages already described in connection with the embodiment of FIGS. 7 and 8, further peak power randomization can be exploited by the shift of the orthogonal cover code. Peak power randomization is improved due to the alternating code elements in the frequency domain. However, the pattern of FIG. 9 is slightly more complex, due to the code shift between the CDM groups.

Figure 11:
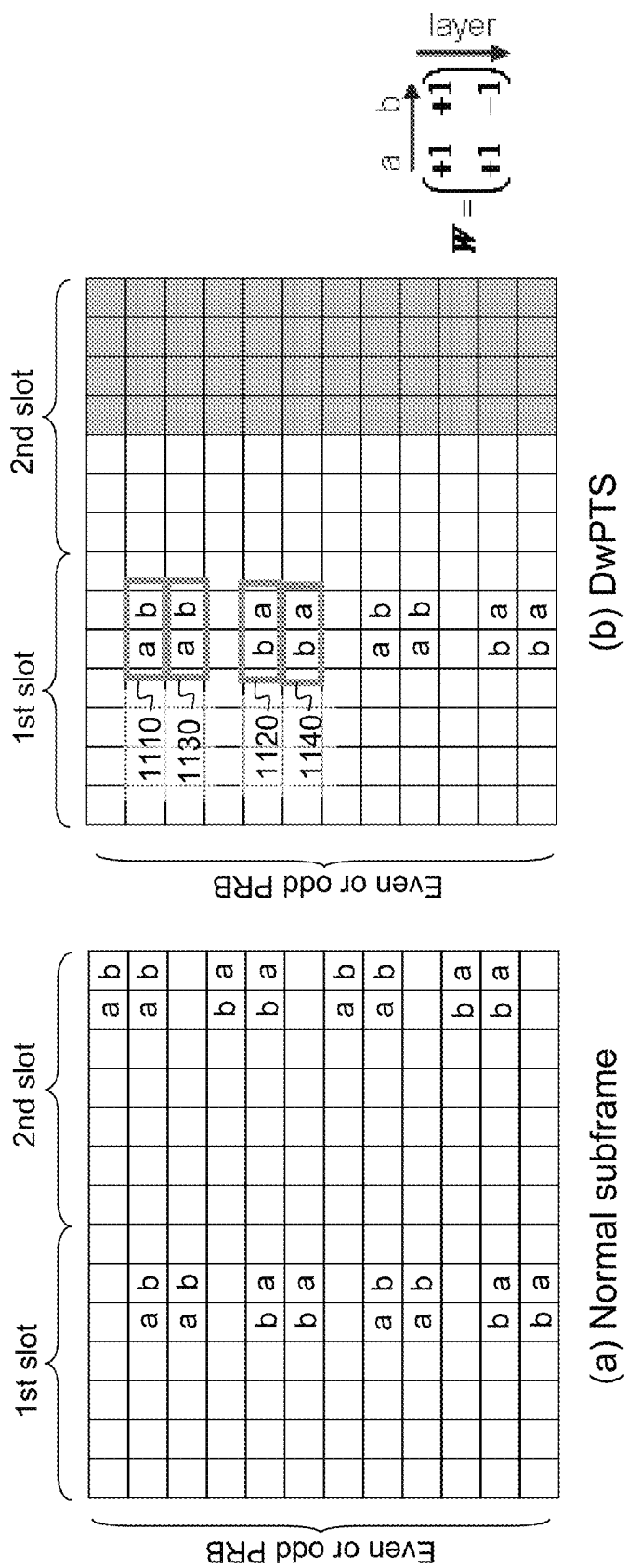
FIG. 11 is a schematic diagram illustrating a reference signal pattern.
Figure 12:
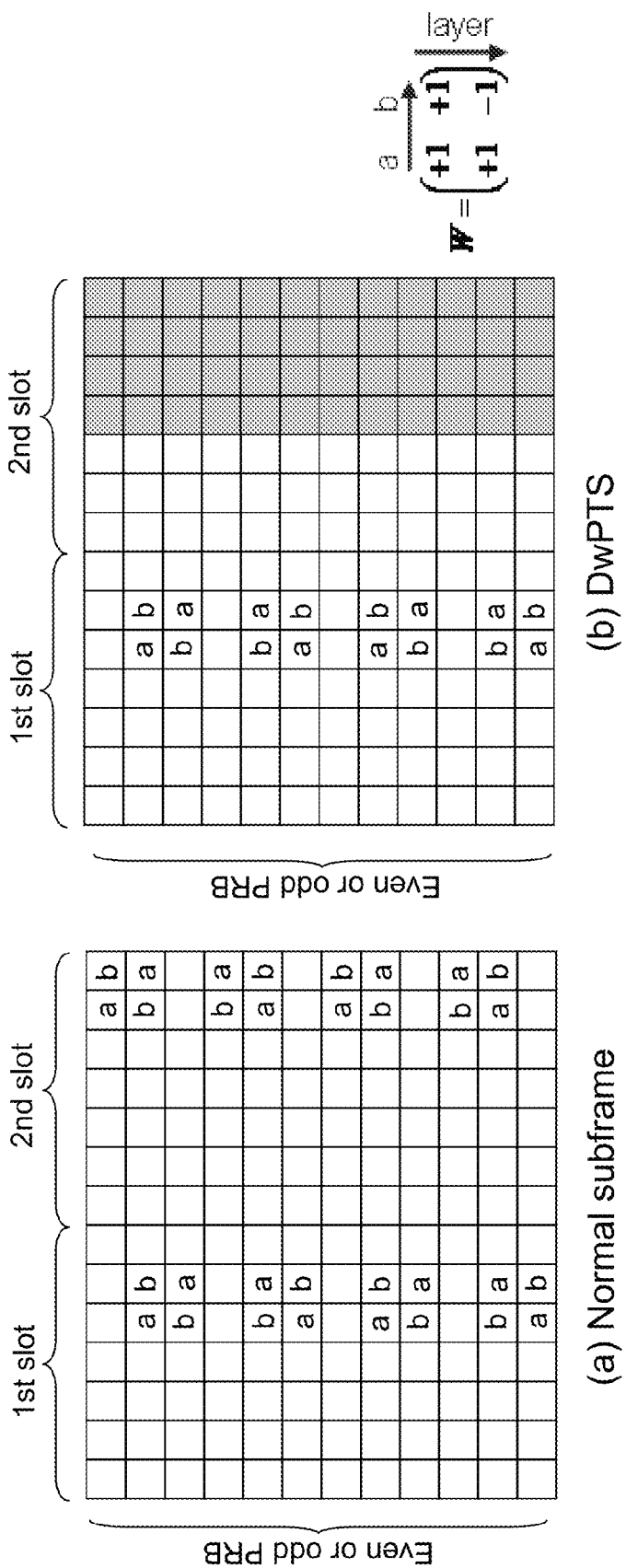
FIG. 12 is a schematic diagram illustrating a reference signal pattern.

A method in a network node, e.g. an eNodeB, for transmitting a reference signal according to a further embodiment will now be described with reference to FIGS. 11-13. The OCC mapping pattern shown in FIGS. 11 and 12, respectively, present two different mechanisms, for both a normal subframe and a special subframe with DwPTS, when extended cyclic prefix (CP) is used. FIG. 11 shows the same pattern applied for two CDM groups while FIG. 12 shows a different pattern applied for respective CDM group. Here, length-2 Walsh Codes are used.

In this example, a first reference signal is transmitted in a first code division multiplexing, CDM, group, and a second reference signal is transmitted in a second CDM group. Each CDM group comprising at least two CDM subgroups, and each CDM subgroup comprises two resource elements.

Figure 13:
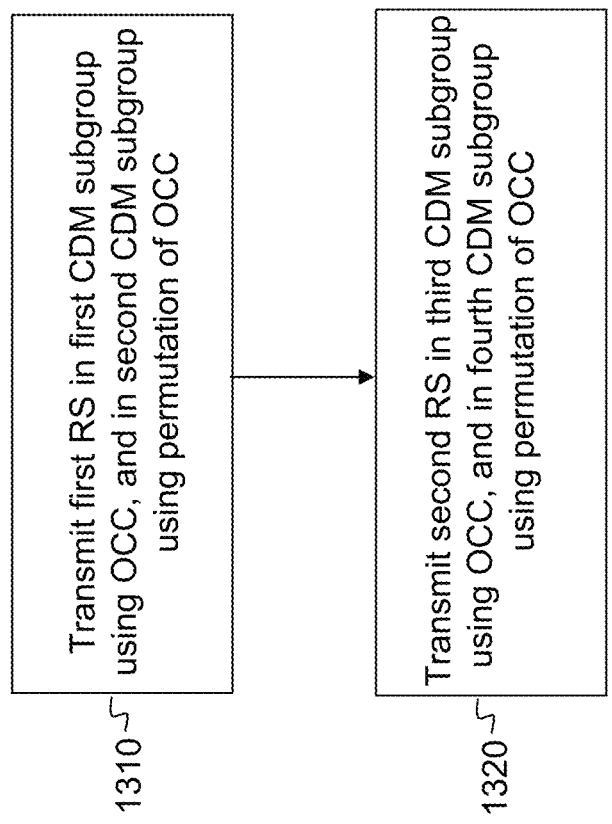
FIG. 13 is a flow chart illustrating an example method.

The method steps are shown in the flow chart of FIG. 13. In a first step 1310, the network node transmits the first reference signal over a first CDM subgroup using an orthogonal cover code, and over a second CDM subgroup using a permutation of the orthogonal cover code.

In a further step 1320, the network node transmits the second reference signal over a third CDM subgroup using the orthogonal cover code, and over a fourth CDM subgroup using the permutation of the orthogonal cover code. The permutation of the orthogonal cover code is selected in such a way as to enable peak power randomization within a single resource block.

In one variant, the permutation comprises reversing the order of the code elements. This is shown in FIG. 11, where code elements a, b in the first CDM subgroup 1110 and the third CDM subgroup 1130 are reversed to become b, a in the second CDM subgroup 1120 and the fourth CDM subgroup 1140.

In some embodiments, the first CDM subgroup is repeated an equal number of times as the second CDM subgroup within one resource block.

In some further embodiments, the third CDM subgroup is repeated an equal number of times as the fourth CDM subgroup within one resource block.

In some variants, such as the one shown in FIG. 12, the orthogonal cover code used in the third CDM subgroup is shifted compared to the orthogonal cover code used in the first CDM subgroup. In other words, the OCC is shifted between the first and second CDM groups. In other variants, the orthogonal cover code used in the third CDM subgroup is applied in the same order as the orthogonal cover code used in the first CDM subgroup. That is to say, the same pattern is used in the two CDM groups.

In the present example, the orthogonal cover code is a length 2 Walsh code.

It should be understood that although the present example is described from the point of view of a single antenna port, reference signals from up to two antenna ports may be multiplexed over the first CDM subgroup and the second CDM subgroup, a different orthogonal cover code being used for each of the two antenna ports. Also, reference signals from two additional antenna ports may be multiplexed over the third CDM subgroup and the fourth CDM subgroup, a different orthogonal cover code being used for each of the two additional antenna ports.

An advantage of the present example is that full peak power randomization may be reached within one PRB. This is because the OCC is permutated such that the code elements are alternated in the frequency domain. For example, in the pattern shown in FIG. 12(*a*), in the fifth OFDM symbol there are four occurrences of code element "a", and four occurrences of code element "b". The same applies to the sixth, thirteenth and fourteenth OFDM symbols. This implies that the antenna port transmit power is balanced between different OFDM symbols within a single PRB, thereby reducing power peaks.

Some further characteristics of the present example are:
A length-2 OCC mapping is designed based on an example DM-RS pattern, where a length-2 OCC is used for channel estimation. It is assumed here that only rank 1-4 will be supported in the extended CP case. Thus, each CDM group supports up to two layers.

The present example reuses the same mechanism applied in normal CP for extended CP, which reduces implementation complexity.

The OCC mapping pattern is the same for even and odd PRBs.

Time-frequency 2D-orthogonality can be exploited per slot per PRB.

Figure 14:
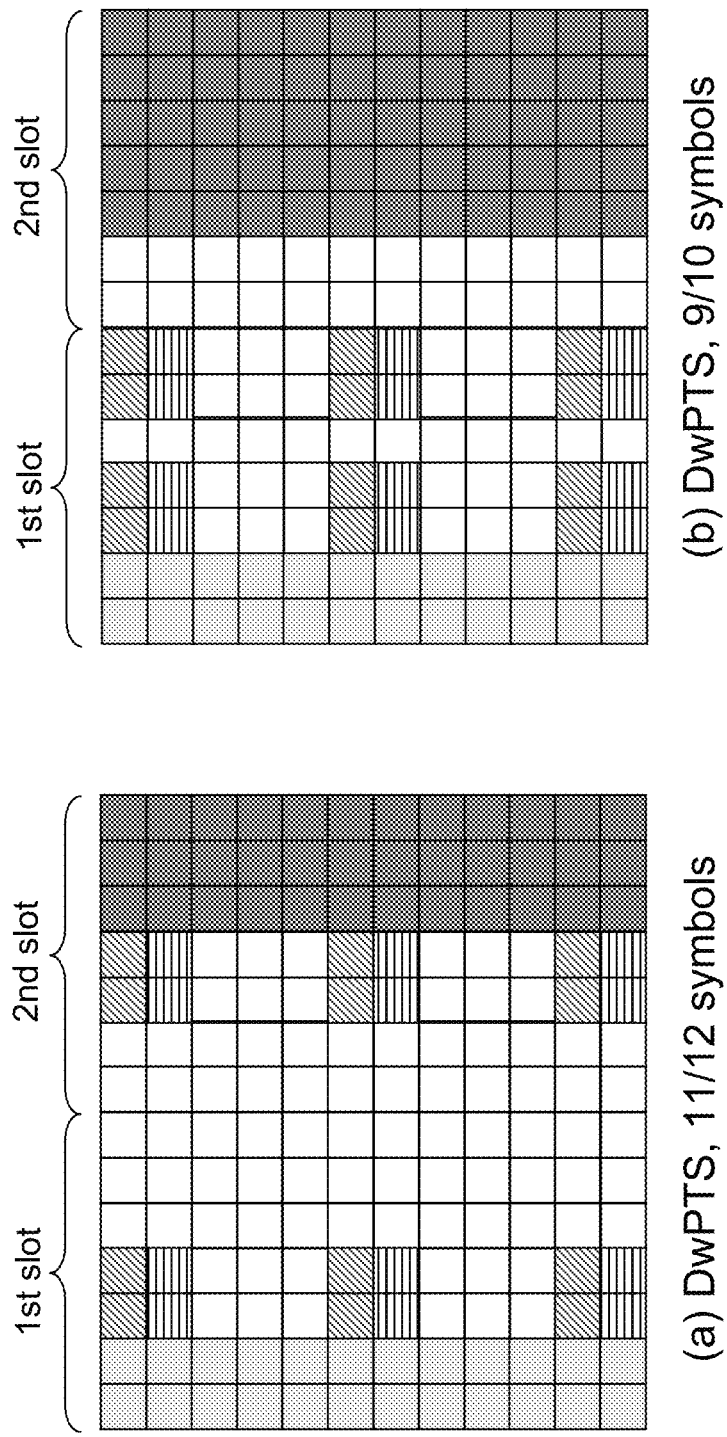
FIG. 14 is a schematic diagram illustrating a reference signal pattern.

FIG. 14 shows an example DM-RS pattern for DwPTS using normal CP. It is pointed out that various embodiments described herein are also applicable to this pattern. In particular, in the right-most grid of FIG. 14, all four REs carrying reference signals in a CDM subgroup are comprised in the first time slot. However, the same principles for permutation of the code elements between the first and second CDM subgroups may be used here. For instance, if the code elements a, b, c, and d are applied in the first CDM subgroup, the permutated code may be e.g. d, a, b, c. Other possibilities are for example a, d, b, c or a, b, d, c. Also, the OCC applied in the second CDM group may or may not be shifted compared to the OCC in the first CDM group. The permutations of the OCC may be selected in such a way as to enable peak power randomization, analogously to the embodiments described in connection with FIG. 11-13 above.

Figure 15:
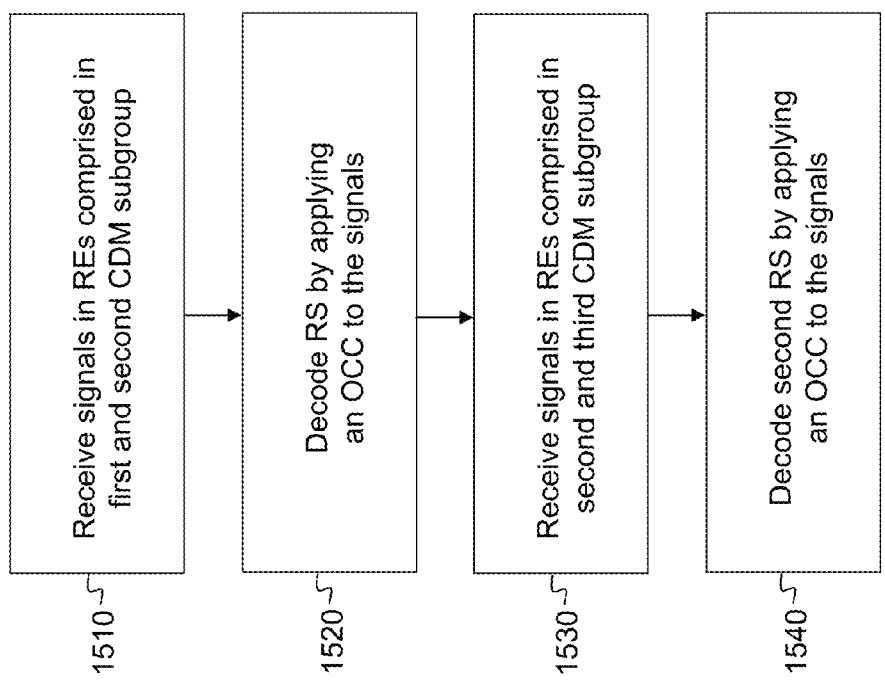
FIG. 15 is a flow chart illustrating an example method.

A method in a user equipment for decoding a reference signal according to some embodiments will now be described, with reference to the pattern of FIG. 7, and the flow chart in FIG. 15. The reference signal is received in a CDM group, the CDM group comprising at least two CDM subgroups. Each CDM subgroup is being received on a different subcarrier, and each CDM subgroup comprises resource elements in a first time slot and a subsequent time slot.

In a first time slot, the UE receives a first signal in a first set of resource elements comprised in a first CDM subgroup 710, and a second signal in a second set of resource elements comprised in a second CDM subgroup 720. As a specific example, the first signal is received in the REs marked "a" and "b" in CDM subgroup 710, and the second signal is received in the REs marked "d" and "c" in CDM subgroup 720.

The UE decodes the reference signal by applying an orthogonal cover code to the signals in the first and second set of resource elements. As can be seen in FIG. 7, the first signal corresponds to a reference signal which has been encoded using code elements a and b, whereas the second signal corresponds to the same reference signal, but encoded using code elements c and d. The first and second signals together contain enough information to restore the original reference signal.

Thus, the UE is able to decode the RS based on information received in the first time slot, and does not have to wait for the second time slot to arrive.

In a variant of this embodiment, the UE decodes a second reference signal which is received in a second CDM group. The second CDM group comprises at least two CDM subgroups, each CDM subgroup being received on a different subcarrier. Each CDM subgroup comprises resource elements in a first time slot and a subsequent time slot. The UE receives, in a first time slot, a third signal in a set of resource elements comprised in a third CDM subgroup 730, and a fourth signal in a set of resource elements comprised in a fourth CDM subgroup 740. Similarly to what was described above, the third and fourth signals each contain The UE decodes the second reference signal by applying an orthogonal cover code to the third and fourth set of resource elements.

In some variants, each CDM subgroup comprises four REs, two of which are comprised in the first time slot.

It is pointed out that signals from up to four antenna ports may be multiplexed within each CDM subgroup, by applying different orthogonal cover codes to each reference signal as described above. Thus, in a further embodiment, the UE decodes three additional reference signals, corresponding to three additional antenna ports multiplexed within the first CDM group, by applying a different orthogonal cover code for each reference signal to the first and second signals. It should be understood here that when several reference signals are multiplexed within the same CDM subgroup, the different orthogonal cover codes must come from the same set of OCCs, such that the codes are all mutually orthogonal. For example, the different codes may be different rows from the length-4 Walsh matrix.

In a yet further embodiment, the UE decodes three signals, corresponding to three additional antenna ports multiplexed in the second CDM group, by applying a different orthogonal cover code for each reference signal to the third and fourth signals. Consequently, in this embodiment a total of eight reference signals are decoded, four in each CDM group.

Figure 16:
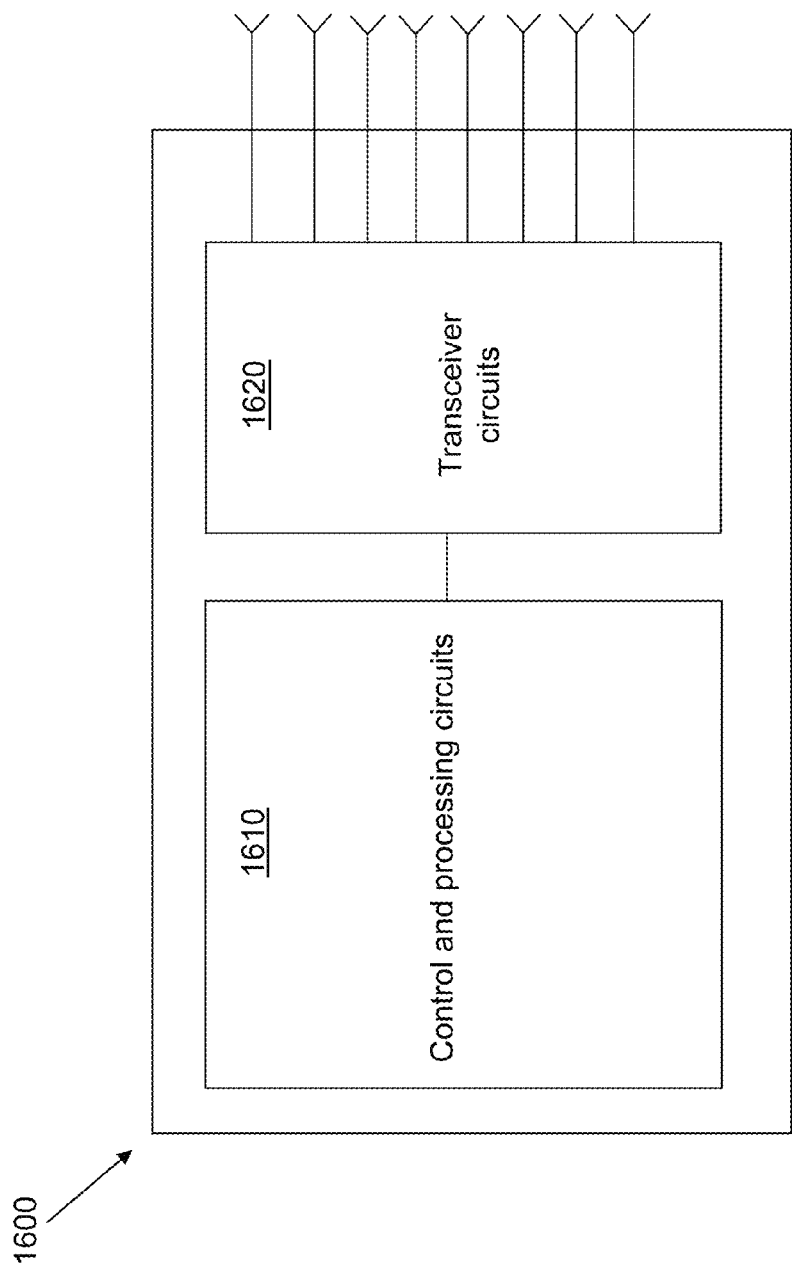
FIG. 16 is a schematic block diagram illustrating an example radio network node.

A radio network node, configured to transmit reference signals in accordance with some of the embodiments described above, is illustrated in FIG. 16. The radio network node 1600 could for instance be implemented as an LTE eNodeB. Those skilled in the art will recognize that the radio network node 1600 in one or more embodiments includes one or more processing circuits 1610, 1620, such as microprocessors, transceiver circuits 1620, or other computer/digital processing circuits, that are configured to carry out the functions disclosed herein for transmitting reference signals. Although FIG. 16 shows the network node equipped with eight antenna ports, it should be understood that in some embodiments, the network node 1600 may have another number of antenna ports, e.g. two or four.

In one example, the one or more processing circuits 1610, 1620 are configured to transmit a reference signal over a first CDM subgroup using an orthogonal cover code, the first CDM subgroup comprising resource elements in a first time slot and a subsequent time slot. Furthermore, the one or more processing circuits 1610, 1620 are configured to transmit the reference signal over a second CDM subgroup using a permutation of the orthogonal cover code, wherein the second CDM subgroup comprises resource elements in the first time slot and the second time slot. The one or more processing circuits 1610, 1620 are further configured to select the permutation of the orthogonal cover code in such a way as to enable decoding of the reference signal in the frequency domain. That is to say, a receiving UE may decode the signal by applying the orthogonal cover code only to the resource elements in the CDM group which are comprised in the first time slot.

In some variants of this embodiment, the one or more processing circuits 1610, 1620 are configured to transmit a second reference signal over a second antenna port in a second CDM group, the second CDM group comprising at least two CDM subgroups, each CDM subgroup being transmitted on a different subcarrier, each CDM subgroup comprising one or more resource elements. In order to perform this transmission of the second reference signal, the one or more processing circuits 1610, 1620 are configured to transmit 830 the second reference signal over a third CDM subgroup 730 using the orthogonal cover code, the third CDM subgroup 730 comprising resource elements in a first time slot and a subsequent time slot. Furthermore, the one or more processing circuits 1610, 1620 are configured to transmit 840 the second reference signal over a fourth CDM subgroup 740 using a second permutation of the orthogonal cover code, the fourth CDM subgroup 740 comprising resource elements in the first time slot and the subsequent time slot. The one or more processing circuits 1610, 1620 are configured to select the second permutation of the orthogonal cover code in such a way as to enable decoding of the second reference signal in the frequency domain, by applying the orthogonal code only to resource elements in the second CDM group which are comprised in the first time slot.

In some variants, the one or more processing circuits 1610, 1620 are configured to transmit the second reference signal in the third CDM subgroup 730 using an orthogonal cover code which is shifted, e.g. using a cyclic shift, compared to the orthogonal cover code used in the first CDM subgroup 710. That is to say, the OCC is shifted between the first and second CDM groups.

In other variants, the one or more processing circuits 1610, 1620 are configured to apply the orthogonal cover code used in the third CDM subgroup 730 in the same order as the orthogonal cover code used in the first CDM subgroup 710.

In some variants, the orthogonal cover code is a Walsh code. In particular variants, the OCC is of length 4, and each CDM subgroup comprises four resource elements.

In some variants, the one or more processing circuits 1610, 1620 are configured to perform the permutation of the orthogonal cover code by shifting the orthogonal cover code.

In some variants, the one or more processing circuits 1610, 1620 are configured to perform the permutation of the orthogonal cover code by applying the code elements that were applied to the resource elements in the first time slot in the first CDM subgroup 510, 710 to the resource elements in the second time slot in the second CDM subgroup 520, 720, and vice versa.

In other variants, the one or more processing circuits 1610, 1620 are configured to perform the permutation of the orthogonal cover code by reversing the order of the code elements.

In some variants, the one or more processing circuits 1610, 1620 are configured to multiplex reference signals from four antenna ports over the first CDM subgroup 510 and the second CDM subgroup 520, and to use a different orthogonal cover code for each of the four antenna ports.

In some further variants, the one or more processing circuits 1610, 1620 are configured to multiplex reference signals from an additional four antenna ports over the third and fourth CDM subgroups 730, 740, and to use a different orthogonal cover code for each of the additional four antenna ports.

In some variants, the one or more processing circuits 1610, 1620 are configured to repeat the first CDM subgroup 510, 710 an equal number of times as the second CDM subgroup 520, 720 over two resource blocks.

In some further variants, the one or more processing circuits 1610, 1620 are configured to repeat the third CDM subgroup 730 an equal number of times as the fourth CDM subgroup 740 over two resource blocks.

In another example, the one or more processing circuits 1610, 1620 are configured to transmit a first reference signal over a first CDM subgroup using an orthogonal cover code, and over a second CDM subgroup using a permutation of the orthogonal cover code. The one or more processing circuits 1610, 1620 are configured to transmit the second reference signal over a third CDM subgroup using the orthogonal cover code, and over a fourth CDM subgroup using the permutation of the orthogonal cover code. The one or more processing circuits 1610, 1620 are furthermore configured to select the permutation of the orthogonal cover code in such a way as to enable peak power randomization within a single resource block.

In some variants of this example, the one or more processing circuits 1610, 1620 are configured to perform the permutation of the orthogonal cover code by reversing the order of the code elements.

In some variants, the one or more processing circuits 1610, 1620 are configured to repeat the first CDM subgroup an equal number of times as the second CDM subgroup within one resource block.

In some further variants, the one or more processing circuits 1610, 1620 are configured to repeat the third CDM subgroup an equal number of times as the fourth CDM subgroup within one resource block.

In some variants, the one or more processing circuits 1610, 1620 are configured to use an orthogonal cover code in the third CDM subgroup, which is shifted, e.g. using a cyclic shift, compared to the orthogonal cover code used in the first CDM subgroup. Thus, the OCC is shifted between the first and second CDM groups.

Figure 17:
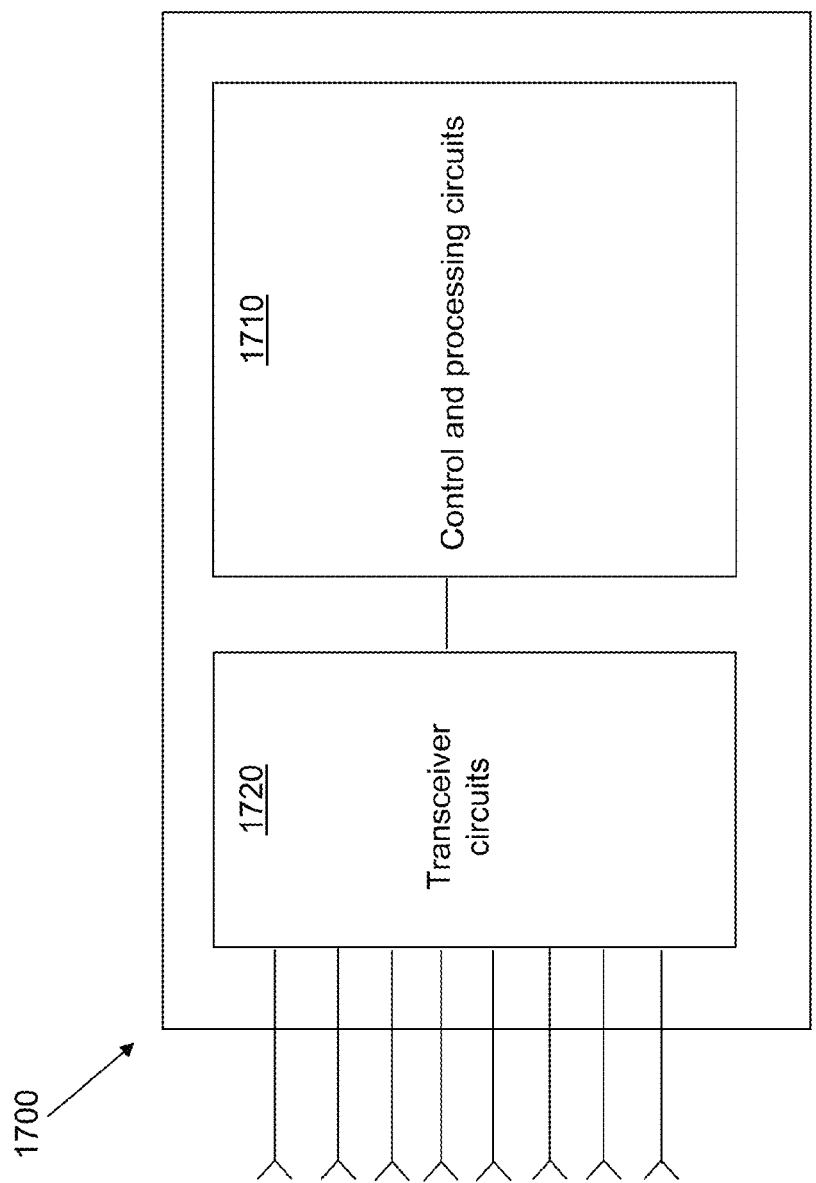
FIG. 17 is a schematic block diagram illustrating an example user equipment.

FIG. 17 illustrates a user equipment 1700, configured to decode reference signals in accordance with some of the embodiments described above. Those skilled in the art will recognize that the UE 1700 in one or more embodiments includes one or more processing circuits 1710, 1720, such as microprocessors, transceiver circuits 1720, or other computer/digital processing circuits, that are configured to carry out the functions disclosed herein for decoding reference signals. In one example, the UE 1700 is configured to receive, in a first time slot, a first set of resource elements comprised in a first CDM subgroup. The UE 1700 is further configured to receive, in the first time slot, a second set of resource elements comprised in a second CDM subgroup. The UE 1700 is also configured to decode the reference signal by applying an orthogonal cover code to the first and second set of resource elements.

In some variants of this example, the one or more processing circuits 1710, 1720 are configured to decode a second reference signal which is received in a second code division multiplexing, CDM, group, the CDM group comprising at least two CDM subgroups, each CDM subgroup being received on a different subcarrier, each CDM subgroup comprising resource elements in a first time slot and a subsequent time slot. To perform the decoding of the second reference signal, the one or more processing circuits 1710, 1720 are configured to receive, in the first time slot, a third set of resource elements comprised in a third CDM subgroup, and a fourth set of resource elements comprised in a fourth CDM subgroup. Furthermore, the one or more processing circuits 1710, 1720 are configured to decode the reference signal by applying an orthogonal cover code to the third and fourth set of resource elements.

In some variants, each CDM subgroup comprises four REs, two of which are comprised in the first time slot.

In some variants, the one or more processing circuits 1710, 1720 are configured to decode three additional reference signals, sent by three additional antenna ports, by applying a different orthogonal cover code for each reference signal to the first and second set of resource elements. It should be understood here that when several reference signals are multiplexed within the same CDM subgroup, the different orthogonal cover codes must come from the same set of OCCs, such that the codes are all mutually orthogonal. For example, the different codes may be different rows from the length-4 Walsh matrix.

In some further variants, the one or more processing circuits 1710, 1720 are configured to decode three additional reference signals by applying a different orthogonal cover code for each reference signal to the third and fourth set of resource elements.

In the present disclosure, when using the word "comprise" or "comprising" it shall be interpreted as non-limiting, i.e. meaning "consist at least of".

Furthermore, it is pointed out that whenever this disclosure refers to applying an OCC to certain resource elements, e.g. "the resource elements in the CDM group comprised in the first time slot", what is meant is that the OCC is applied to the signal which is transmitted or received in those resource elements.

The present invention is not limited to the above-describe embodiments. Various alternatives, modifications and equivalents may be used. Therefore, the above embodiments should not be taken as limiting the scope of the invention, which is defined by the appended claims. One point to be highlighted is that although the invention has been illustrated using certain specific reference signal patterns, the general concepts are potentially applicable to other DM-RS patterns as well.

The invention claimed is:

1. A method in a user equipment for decoding a reference signal, wherein the method comprises:
   receiving, by the user equipment in a first time slot, a first set of resource elements comprised in a first code division multiplexing (CDM) subgroup, and a second set of resource elements comprised in a second CDM subgroup, wherein the reference signal is comprised of a first CDM group, which comprises the first and second CDM subgroups, and wherein the first and second CDM subgroups are received on a different subcarrier and each of the first and second CDM subgroups comprise resource elements in the first time slot and a subsequent time slot;
   decoding, by the user equipment, the reference signal by applying an orthogonal cover code to the first and second set of resource elements in the first time slot and not to the first and second set of resource elements in the subsequent time slot, wherein the first CDM subgroup is repeated an equal number of times as the second CDM subgroup over two resource blocks;
   decoding a second reference signal which is received in a second CDM group, the second CDM group comprising at least a third CDM subgroup and a fourth CDM subgroup received on different subcarriers and comprising resource elements in the first time slot and the subsequent time slot, wherein the second reference signal is decoded by receiving, in the first time slot, a third set of resource elements comprised in the third CDM subgroup, and a fourth set of resource elements comprised in the fourth CDM subgroup;

decoding the second reference signal by applying a permutation of the orthogonal cover code to the third and fourth set of resource elements.

2. The method of claim 1, wherein two resource elements are received in each CDM subgroup in the first time slot.

3. The method of claim 1, further comprising decoding three additional reference signals by applying a different orthogonal cover code for each reference signal to sets of resource elements received in the first time slot and related to a respective one of the three additional reference signals.

4. The method of claim 1, further comprising decoding three additional reference signals by applying a different orthogonal cover code for each reference signal.

5. A user equipment configured to decode a reference signal, wherein the user equipment comprises one or more processing circuits configured to:

receive, in a first time slot, a first set of resource elements comprised in a first code division multiplexing (CDM) subgroup, and a second set of resource elements comprised in a second CDM subgroup, wherein the reference signal is comprised of a first CDM group, which comprises the first and second CDM subgroups, and wherein the first and second CDM subgroups are received on a different subcarrier and each of the first and second CDM subgroups comprise resource elements in the first time slot and a subsequent time slot;

decode the reference signal by applying an orthogonal cover code to the first and second set of resource elements in the first time slot and not to the first and second set of resource elements in the subsequent time slot, wherein the first CDM subgroup is repeated an equal number of times as the second CDM subgroup over two resource blocks;

decode a second reference signal received in a second CDM group, wherein the second CDM group comprises at least a third CDM subgroup and a fourth CDM subgroup received on different subcarriers and comprising resource elements in the first time slot and the subsequent time slot, and wherein said one or more processing circuits are configured to decode the second reference signal by receiving, in the first time slot, a third set of resource elements comprised in the third CDM subgroup, and a fourth set of resource elements comprised in the fourth CDM subgroup; and decoding the second reference signal by applying a permutation of the orthogonal cover code to the third and fourth set of resource elements.

6. The method of claim 1, further comprising decoding three additional reference signals, corresponding to three additional antenna ports multiplexed within the first CDM group, by applying a different orthogonal cover code for each reference signal to sets of resource elements received in the first time slot and related to a respective one of the three additional reference signals.

7. The method of claim 1, wherein the orthogonal cover code is a length 4 Walsh code.

8. The user equipment according to claim 5, wherein each CDM subgroup in the first CDM group comprises four resource elements, two of which are received in the first time slot.

9. The user equipment according to claim 5, further comprising decoding three additional reference signals, corresponding to three additional antenna ports multiplexed within the first CDM group, by applying a different orthogonal cover code for each reference signal to the first and second set of resource elements.

10. A method in a user equipment for decoding a reference signal which is received in a code division multiplexing (CDM) group, wherein the method comprises the steps of:

receiving, in a first time slot, a first signal corresponding to the reference signal encoded using code elements a and b;

receiving, in the first time slot, a second signal corresponding to the reference signal encoded using code elements c and d;

decoding the reference signal by applying an orthogonal cover code to the first and second signals in the first time slot and not to resource elements in a subsequent time slot, wherein the decoding step occurs prior to arrival of a second time slot;

decoding a second reference signal by receiving, in the first time slot, a third signal corresponding to the second reference signal encoded using code elements a and b and a fourth signal corresponding to the second reference signal encoded using code elements c and d; and decoding the second reference signal by applying a permutation of the orthogonal cover code to the third and fourth signals in the first time slot.

* * * * *

UNITED STATES PATENT AND TRADEMARK OFFICE
CERTIFICATE OF CORRECTION

PATENT NO.          : 9,246,654 B2                                    Page 1 of 1
APPLICATION NO.     : 14/193466
DATED               : January 26, 2016
INVENTOR(S)         : Hu et al.

It is certified that error appears in the above-identified patent and that said Letters Patent is hereby corrected as shown below:

On the Title Page, in Item (57), under "ABSTRACT", in Column 2, Line 7, delete "(OOC)." and insert -- (OCC). --, therefor.

On the Title Page, in Item (57), under "ABSTRACT", in Column 2, Line 11, delete "OOC." and insert -- OCC. --, therefor.

On the Title Page, in Item (57), under "ABSTRACT", in Column 2, Line 13, delete "OOC" and insert -- OCC --, therefor.

On the Title Page, in Item (57), under "ABSTRACT", in Column 2, Line 15, delete "OOC" and insert -- OCC --, therefor.

In the Specification

In Column 1, Line 6, delete "2011;" and insert -- 2011; now Pat No. 8,780,832, --, therefor.

Signed and Sealed this
Twenty-fourth Day of May, 2016

Michelle K. Lee
*Director of the United States Patent and Trademark Office*